(12) United States Patent
Sagar et al.

(10) Patent No.: US 11,354,844 B2
(45) Date of Patent: Jun. 7, 2022

(54) DIGITAL CHARACTER BLENDING AND GENERATION SYSTEM AND METHOD

(71) Applicant: Soul Machines Limited, Auckland (NZ)

(72) Inventors: Mark Andrew Sagar, Auckland (NZ); Tim Szu-Hsien Wu, Auckland Central (NZ); Werner Ollewagen, Auckland (NZ); Xiani Tan, Auckland (NZ)

(73) Assignee: Soul Machines Limited, Auckland (NZ)

( * ) Notice: Subject to any disclaimer, the term of this patent is extended or adjusted under 35 U.S.C. 154(b) by 0 days.

(21) Appl. No.: 17/288,477

(22) PCT Filed: Oct. 25, 2019

(86) PCT No.: PCT/NZ2019/050142
§ 371 (c)(1),
(2) Date: Apr. 23, 2021

(87) PCT Pub. No.: WO2020/085922
PCT Pub. Date: Apr. 30, 2020

(65) Prior Publication Data
US 2021/0390751 A1    Dec. 16, 2021

(30) Foreign Application Priority Data
Oct. 26, 2018  (NZ) ........................ 747626

(51) Int. Cl.
*G06T 13/40*    (2011.01)
*G06T 15/04*    (2011.01)
(Continued)

(52) U.S. Cl.
CPC .............. *G06T 13/40* (2013.01); *G06T 15/04* (2013.01); *G06T 15/503* (2013.01); *G06T 19/20* (2013.01); *G06T 2219/2021* (2013.01)

(58) Field of Classification Search
None
See application file for complete search history.

(56) References Cited

U.S. PATENT DOCUMENTS

2005/0026685 A1    2/2005  Ruark et al.
2007/0229498 A1   10/2007  Matusik et al.
(Continued)

FOREIGN PATENT DOCUMENTS

CN    105488472 A    4/2016
EP      1039417 B1   9/2000
(Continued)

OTHER PUBLICATIONS

Zhou, Jingyong, et al. "3D cartoon face generation by local deformation mapping." The Visual Computer 32.6 (2016): 717-727. (Year: 2016).*

(Continued)

*Primary Examiner* — Vu Nguyen
(74) *Attorney, Agent, or Firm* — Cognition IP, P.C.; Edward Steakley

(57) ABSTRACT

A method for creating a model of a virtual object or digital entity is described, the method comprising receiving a plurality of basic shapes for a plurality of models; receiving a plurality of specified modification variables specifying a modification to be made to the basic shapes; and applying the specified modification(s) to the plurality of basic shapes to generate a plurality of modified basic shapes for at least one model.

15 Claims, 27 Drawing Sheets

(51) Int. Cl.
  *G06T 15/50*   (2011.01)
  *G06T 19/20*   (2011.01)

(56) References Cited

U.S. PATENT DOCUMENTS

| | | |
|---|---|---|
| 2008/0316227 A1 | 12/2008 | Fleury et al. |
| 2009/0153552 A1* | 6/2009 | Fidaleo .................. G06T 15/00 345/419 |
| 2010/0203968 A1 | 8/2010 | Gill et al. |
| 2014/0092090 A1 | 4/2014 | Fleury |
| 2016/0180568 A1 | 6/2016 | Bullivant et al. |

FOREIGN PATENT DOCUMENTS

| | | | |
|---|---|---|---|
| EP | 1453002 | A2 | 9/2004 |
| JP | 4682373 | B2 | 5/2011 |
| KR | 10-1608253 | B1 | 4/2016 |
| WO | 2016177290 | A1 | 11/2016 |
| WO | 2017/006615 | A1 | 1/2017 |

OTHER PUBLICATIONS

PCT Application PCT/NZ2019/050142 International Search Report and Written Opinion dated Mar. 3, 2020.

* cited by examiner

1010

1020

1030

DIGITAL CHARACTER BLENDING AND GENERATION SYSTEM AND METHOD

FIELD

This invention relates to digital character blending and generation system and method.

BACKGROUND

The generation of computer avatars or digital characters for use in gaming or digital human AI systems is well known. Prior art systems for the generation of computer avatars or digital characters focus on generation of cost-effective textures and geometries whose quality may be compromised. Blending of multiple head images is typically performed through a linear combination of entire digital characters. The use of linear combinations for both the geometry and textures is typical.

However, the more characters they use to blend the more blurred out the resulting texture is as fine details are lost. Likewise, for geometries, the more faces used to blend the more smoothed out the resulting geometry is. The faces would eventually all ended up looking like an average face model.

Further prior art systems only blend static faces, and no dynamic expressions are created. Demographic estimation is also typically based on linear regressions.

It is an object of the invention to provide an approach to digital character blending and generation or to at least provide the public or industry with a useful choice.

SUMMARY

According to an example embodiment there is provided a method for creating a model of a virtual object or digital entity, the method comprising:
  receiving as input a plurality of basic shapes for a plurality of models;
  receiving as input at least one modification variable specifying a modification to be made to the basic shapes; and
  applying the specified modifications to the plurality of basic shapes to generate a plurality of modified basic shapes for at least one model.

According to a further example embodiment there is provided a system for creating a model of a virtual object or digital entity, the system comprising:
  at least one processor; and
  a memory, in communication with the at least one processor,
  wherein the processor is programmed to:
  receive a plurality of basic shapes for a plurality of models;
  receive at least one modification variable specifying a modification to be made to the basic shapes; and
  apply the specified modifications to the plurality of basic shapes to generate a plurality of modified basic shapes for at least one model.

According to another example embodiment there is provided a method for creating a region mask to be applied to a virtual object or digital entity, the method comprising:
  receiving a plurality of basic shapes for a plurality of models, the basic shapes represented as a set of muscle deformation descriptors;
  categorizing each muscle deformation descriptor into groups based on their region of influence; and
  generate region masks for each basic shape for at least one model based on the region of influence.

According to yet another example embodiment there is provided a system for creating a region mask to be applied to a virtual object or digital entity, the system comprising:
  at least one processor; and
  a memory, in communication with the at least one processor,
  wherein the processor is programmed to:
  receive a plurality of basic shapes for at least one model, the basic shapes represented as a set of muscle deformation descriptors;
  categorize each muscle deformation descriptor into groups based on their region of influence; and
  generate region masks for each basic shape for at least one model based on the region of influence.

According to a yet further example embodiment there is provided a method for creating a texture model to be applied to a virtual object or digital entity, the method comprising:
  receiving as input one or more texture maps for at least one model;
  identifying a plurality of universal feature locators on each of the one or more texture maps, manually, semi-automatically, or automatically;
  separating the texture maps into a plurality of layers, each layer containing at least one feature;
  receiving as input a plurality of specified modification variables specifying a modification to be made to the texture maps;
  applying the specified modifications; and
  blending the layers to create one or more texture maps for at least one model.

According to a still further example embodiment there is provided a system for creating a texture model to be applied to a virtual object or digital entity, the system comprising:
  at least one processor; and
  a memory, in communication with the at least one processor,
  wherein the processor is programmed to:
  receive one or more texture maps for at least one model;
  identify a plurality of universal feature locators on each of the one or more texture maps;
  separate each of the one or more texture maps into a plurality of layers, each layer containing at least one feature;
  receive a plurality of modification variables specifying a modification to be made to the one or more texture maps; and
  applying the specified modifications and blending the layers to generate one or more texture maps for at least one model.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention, in which.

DETAILED DESCRIPTION

System

In one embodiment the system and method for blending models of digital human including avatars or digital characters is typically implemented on a computer system or systems having at least one CPU, memory, and storage, typically a database. Further a GPU implementation may greatly improve the performance of the system.

Referring to FIG. 1212 an example implementation of the system 1200 is illustrated. A first server system 1210 is connected to a data store 1220. The data store 1220 may be a database. And the first server system 1210 includes one or more servers. The first server system 1210 is connected to the internet 1240. At least one other server system 1250 of users of the models is connectable to the first server system 1210. A number of user system 1230, 1260, 1270 connect to the various server systems 1210, 1250.

Figure 4:
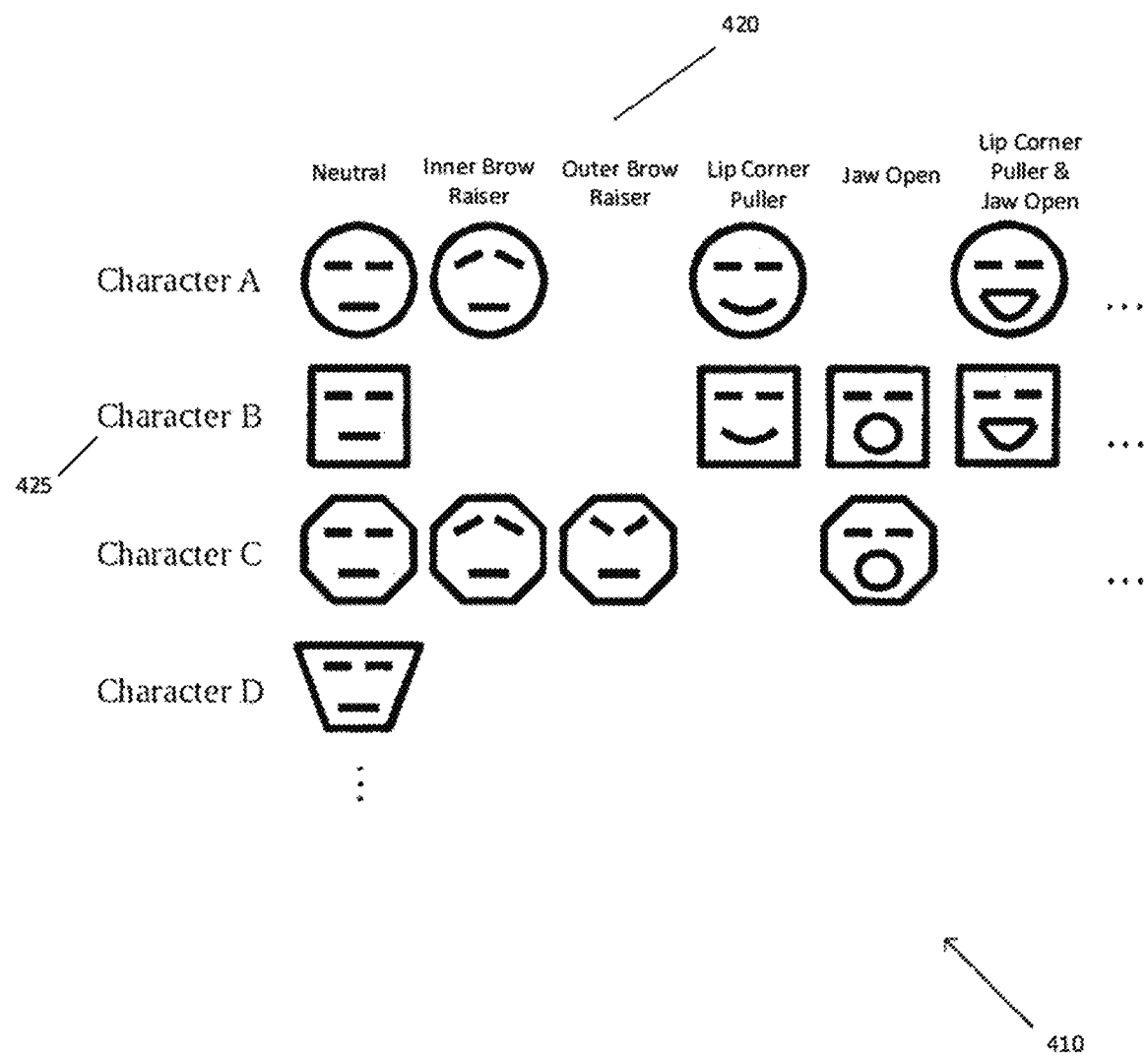
FIG. 4 is an example of a head model grid with missing shapes.

In one embodiment the database used for blending preferably includes ten or more head models ($M_1, M_2, \ldots, M_n \in M$), spanning different ethnicity, gender, age group and physique. The more models that are provided the better the blending system works. While ten head models may be preferred a lesser number could be used. Referring to FIG. 4 an example head model grid with missing shapes 410 is illustrated.

Preferably each head model (Characters A-D) 425 needs to contain at least a neutral face shape, where neutral shapes are of the same mesh topology and are blendable. Each head model may have any number of blend-shapes that represent a set of muscle deformation descriptors, for example, action units (AU) 420 identified by the Facial Action Coding System (FACS). Examples of the action units include 'Inner Brow Raiser', 'Outer Brow Raiser', 'Lip Corner Puller', 'Jaw Open' and 'Lip Corner Puller and Jaw Open'.

Muscle deformation descriptors may also be computed statistically. For example, the principal components of the mesh shape variation of the frames in the animations can be computed using a principal component analysis (PCA). When only the muscles of interest are involved in the animation, the computed principal components may be used as muscle deformation descriptors.

While discussed in relation to head the system and method could equally be used for a body, a partial body, an upper body, a face, part of a face, or part of a head. In case of other parts of the body, these descriptors can be represented by muscle-driven skeletal motion, poses, or deformation of the skin surface.

In the database each muscle deformation descriptor preferably is represented by at least one head model. For each muscle deformation descriptors, we need to have at least one head model representing that muscle deformation descriptor. The muscle deformation descriptor can come from any of the head models. In the FACS-based example head model set illustrated in FIG. 4 only 'Character C' has the 'Outer Brow Raiser' AU.

Further each head model (character) can have any number of expression blend-shapes that are represented as combinations or in-between points of muscle deformation descriptors.

Information on each head model (character) is labelled with metadata that contains demographic information such as ethnicity, gender, age group and physique, or anything else that the user wishes to control. The metadata can also describe physical features such as nose shapes (e.g. hawk, fleshy, turned-up etc.), eyelid structures (e.g. deep set, monolid, hooded etc.), lip shapes (e.g. thin, full etc.). The metadata may also contain information on other physical features.

A reference head model that contains all the anatomical assets associated with the head is selected. Anatomical assets include the skull, teeth, tongue, eyeball, cornea and other important mesh models that make up a detailed and realistic digital human/avatar. The models (characters) can have their own hairstyles, eyelashes styles, facial hairs and the model may include other accessories such as earrings. These accessories can be of different mesh topology.

The initial database may be sparse, where a lot of the head models (character) have missing blendshapes. Face porting may be used to generate the missing blend-shapes to complete the blend-shape grid or alternatively, each blend-shape on the grid can also be manually sculpted by a user.

Figure 1:
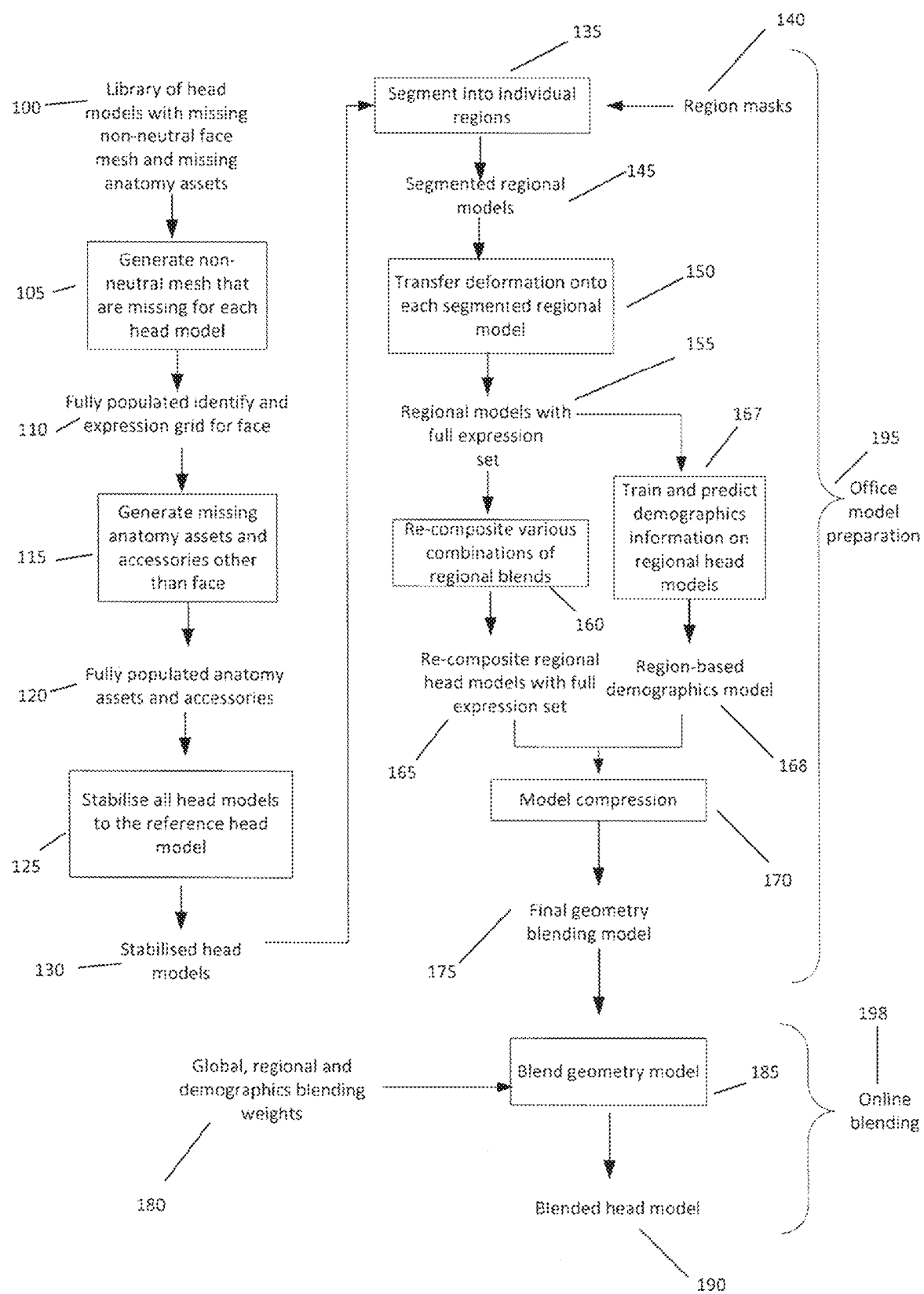
FIG. 1 is a flow diagram of the geometry blending process.

Referring to FIG. 1 the system from the starting library 100 creates a set of stabilised head models 130. This may be done by generating any missing muscle deformation descriptors 105 or having muscle deformation descriptors sculpted by a user so that there is a fully populated library of muscle deformation descriptors for each model. If there are missing assets those may be generated 115 or manually created by a user. Once the assets are fully populated the system may stabilise all head models to a reference head model so that there is a stabilised set of head models 130.

Region Segmentation and Recomposition

Figure 7A:
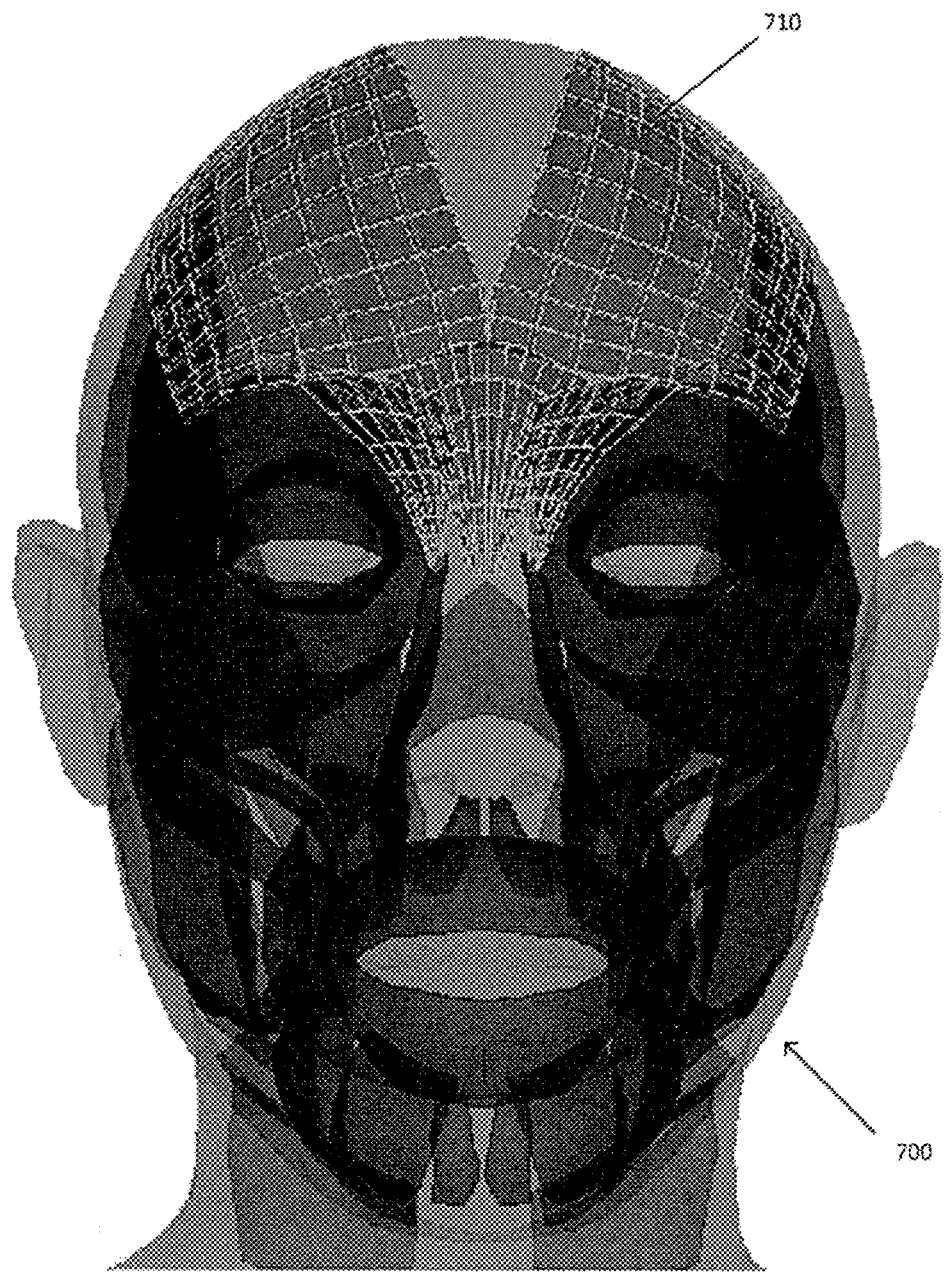
FIG. 7A is an example of a head with the muscle network of the forehead shown.
Figure 7B:
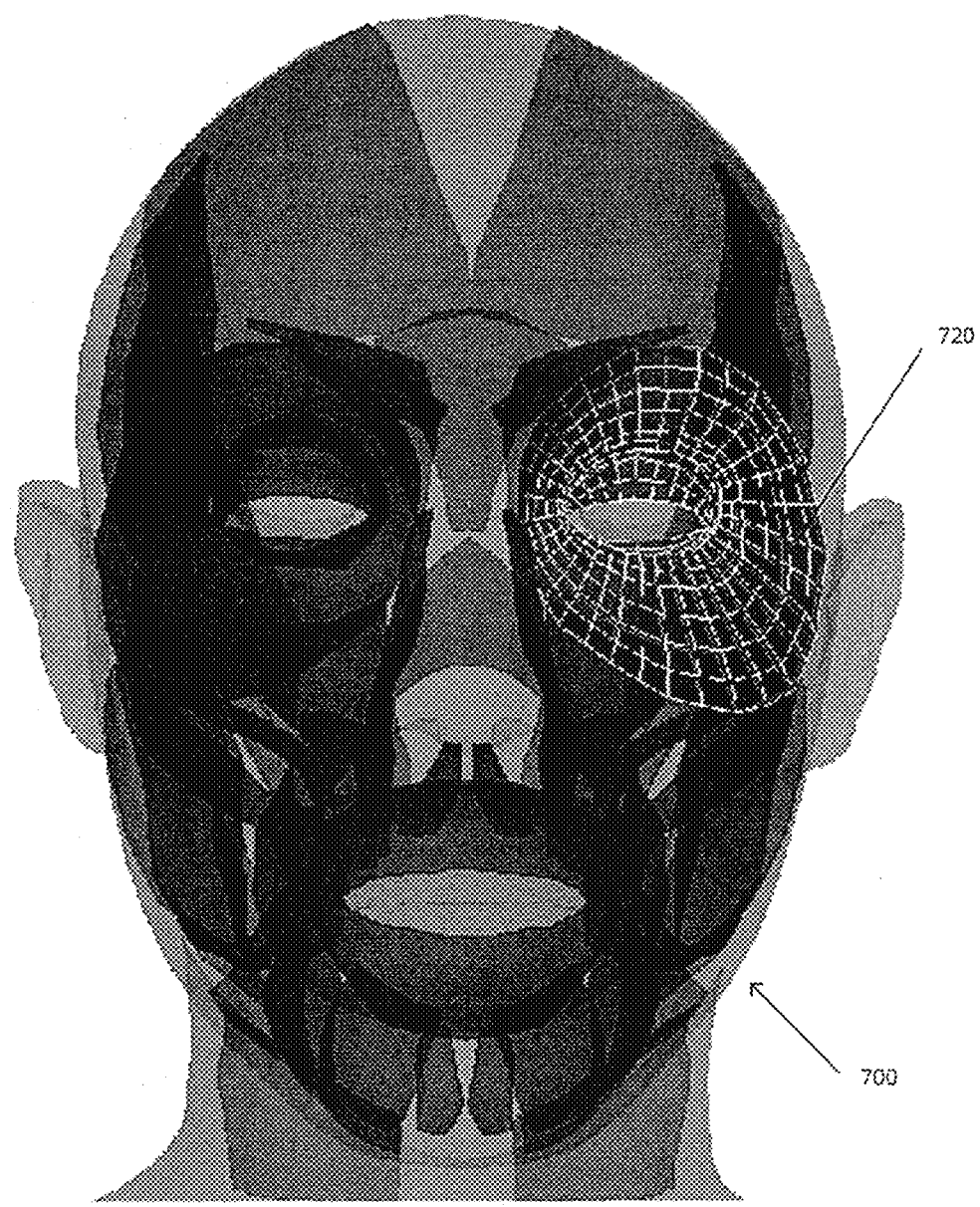
FIG. 7B is an example of a head with the muscle network of the left eye socket shown.
Figure 7C:
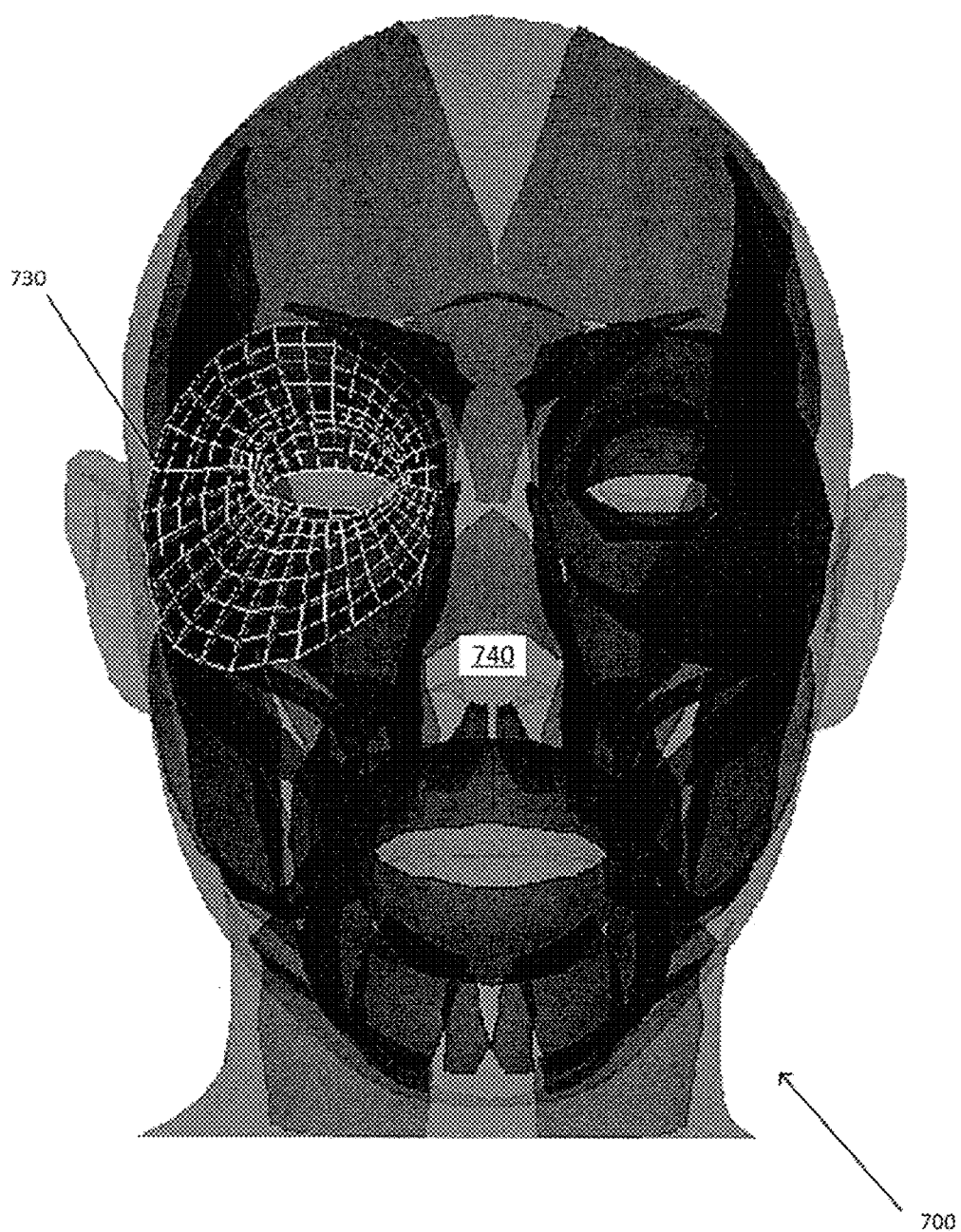
FIG. 7C is an example of a head with the muscle network of the right eye socket shown.
Figure 7D:
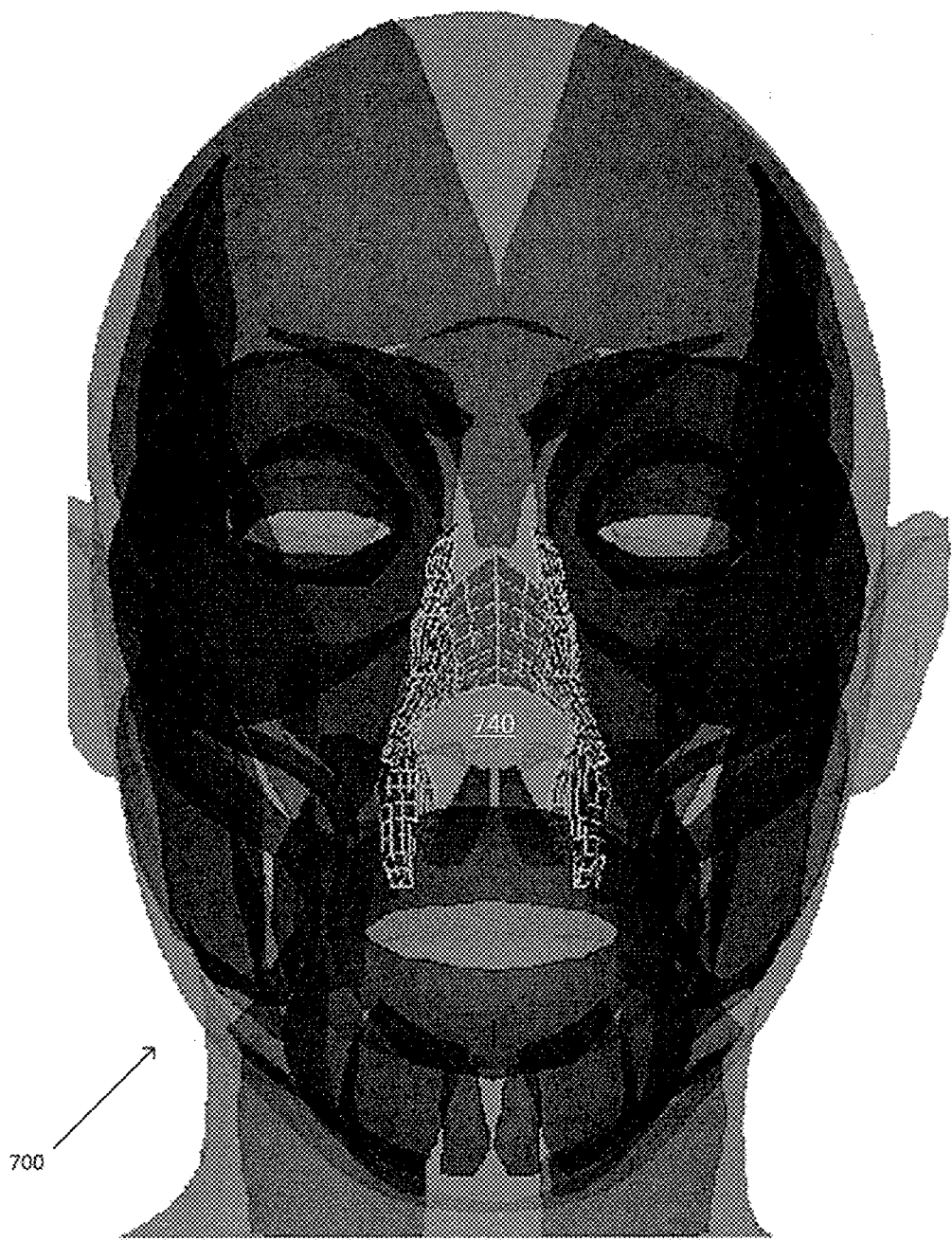
FIG. 7D is an example of a head with the muscle network of the nose shown.
Figure 7E:
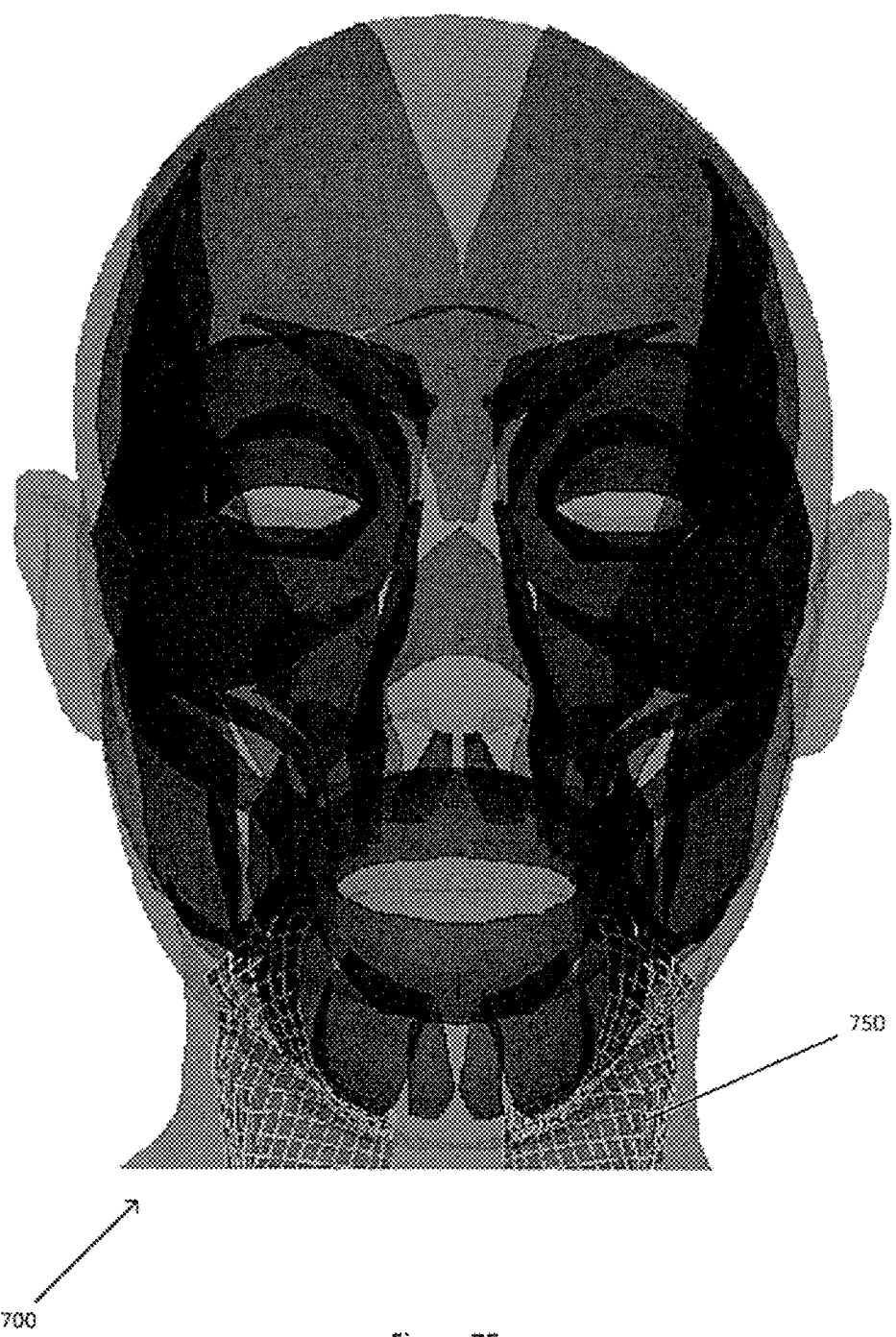
FIG. 7E is an example of a head with the muscle network of the neck shown.
Figure 7F:
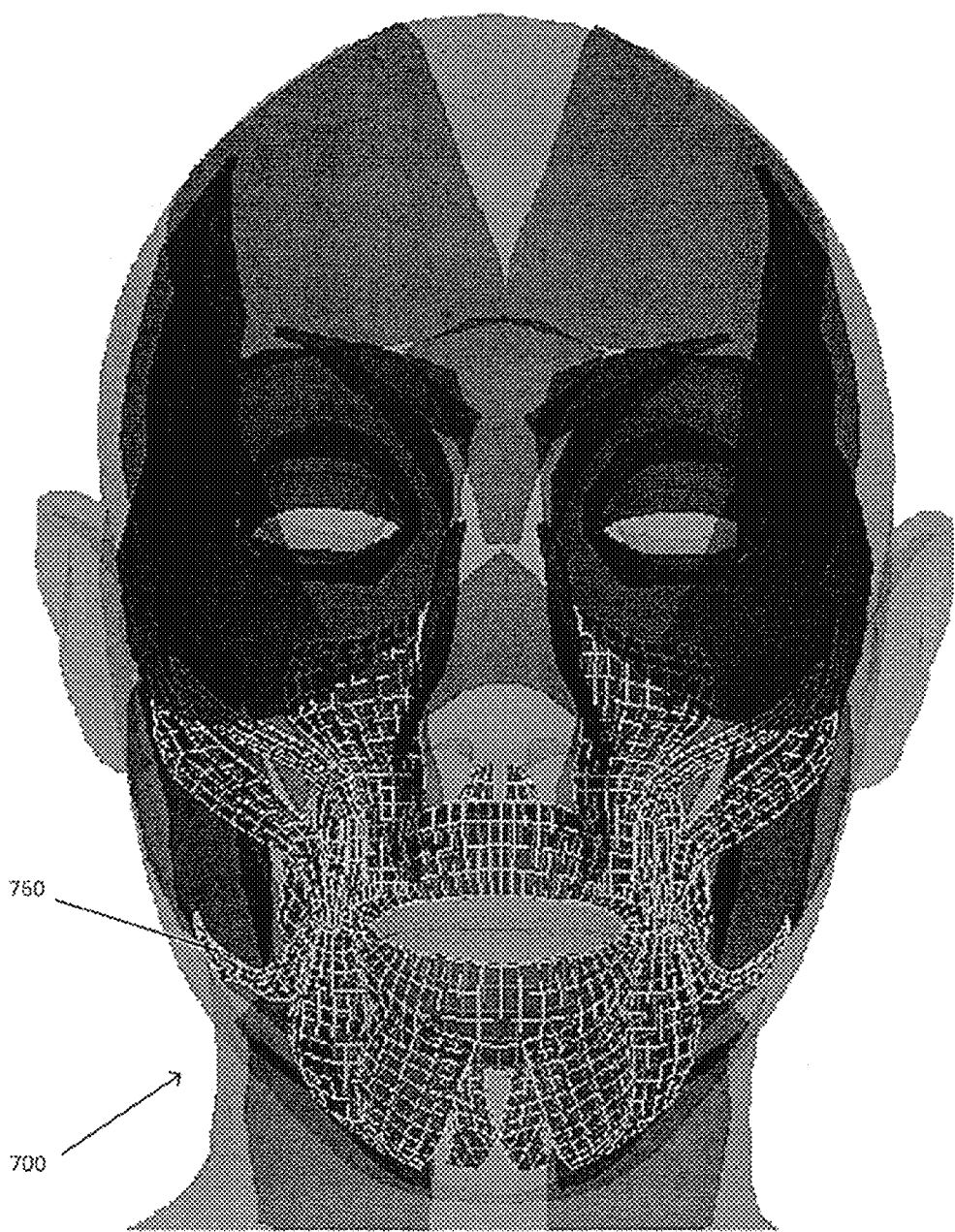
FIG. 7F is an example of a head with the muscle network of the lower face shown.
Figure 11:
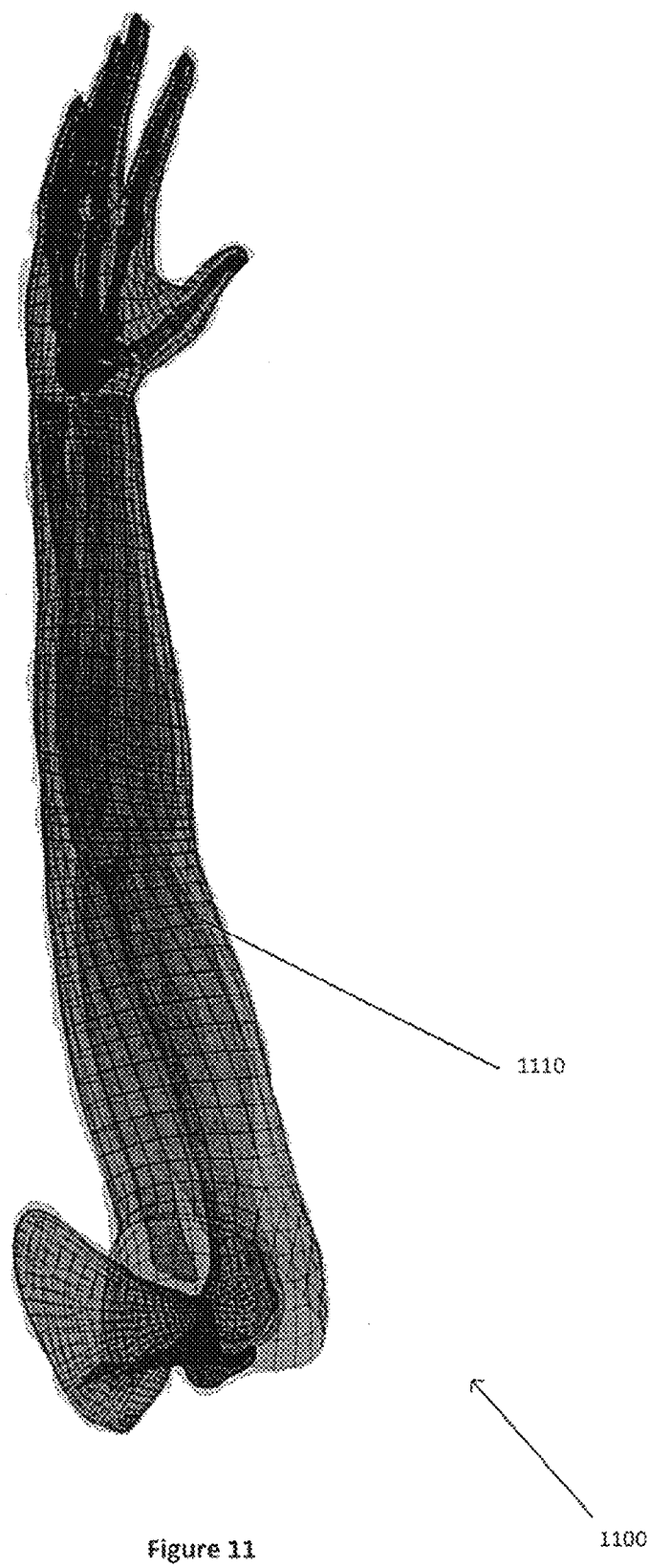
FIG. 11 is an example of an arm with the muscle network shown.
Figure 12:
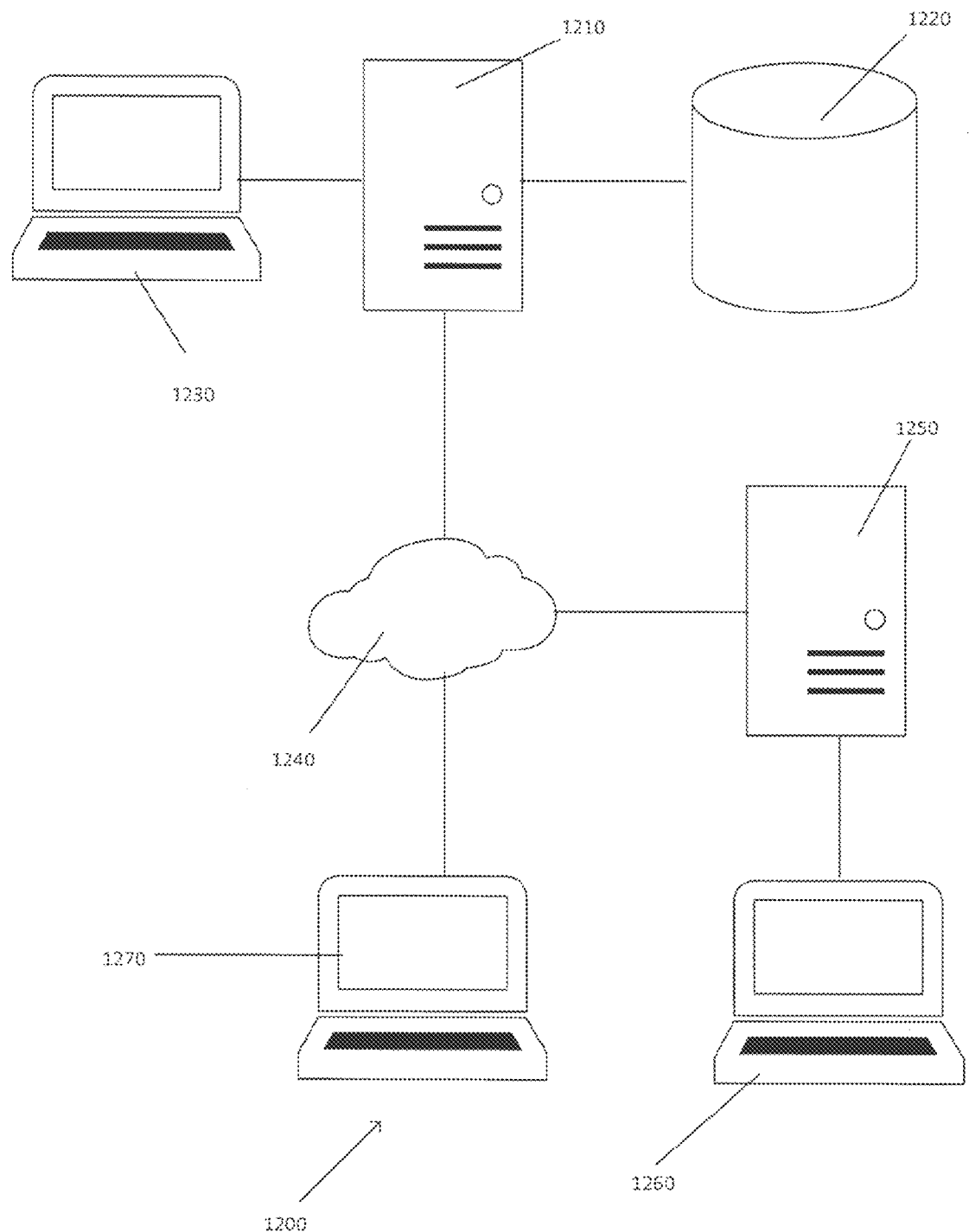
FIG. 12 is an example implementation system of an embodiment.

Region segmentation is used to separate out different facial regions for each head model. These region masks are segmented by grouping muscle deformation descriptors based on the location of muscles, for example: the frontal bone, around the left and right orbital sockets, around the nasal region, neck region, and in the lower face. The lower face muscle deformation descriptors are further categorised into ones that moves the lips, cheek mass and the jaw bone. Combination muscle deformation descriptors that span across different facial regions are ignored. From these grouping, facial region masks are derived, and they are the frontal region, left eye socket, right eye socket, nasal region, left cheek, right cheek, mouth, neck region, and the rest of the head. The facial regions are illustrated in FIG. 7A to 7F. FIG. 7A is an example of a head 700 with the muscle network of the forehead 710 shown. FIG. 7B is an example of the head 700 with the muscle network of the left eye socket 720 shown. FIG. 7C is an example of the head 700 with the muscle network of the right eye socket 730 shown. FIG. 7D is an example of the head 700 with the muscle network of the nose 740 shown. FIG. 7E is an example of the head 700 with the muscle network of the neck 750 shown. FIG. 7F is an example of the head 700 with the muscle network of the lower face 760 shown. The regions masks for each group may be computed by fitting Gaussian distribution to the displacement magnitudes (deformation gradients can also be used here) for each vertex over each muscle deformation descriptors in each group, the regions can overlap. Using a muscle deformation descriptor-based segmentation has an advantage in that segmentation is based on muscle activity and influences, and therefore, the regions extracted using this method have optimal coverage and smoothness on a dynamically deformable face (not just on static faces). In a similar manner region masks may be computed for other parts of the body such as selecting the muscles 1110 of an arm 1100 illustrated in FIG. 11.

Figure 3:
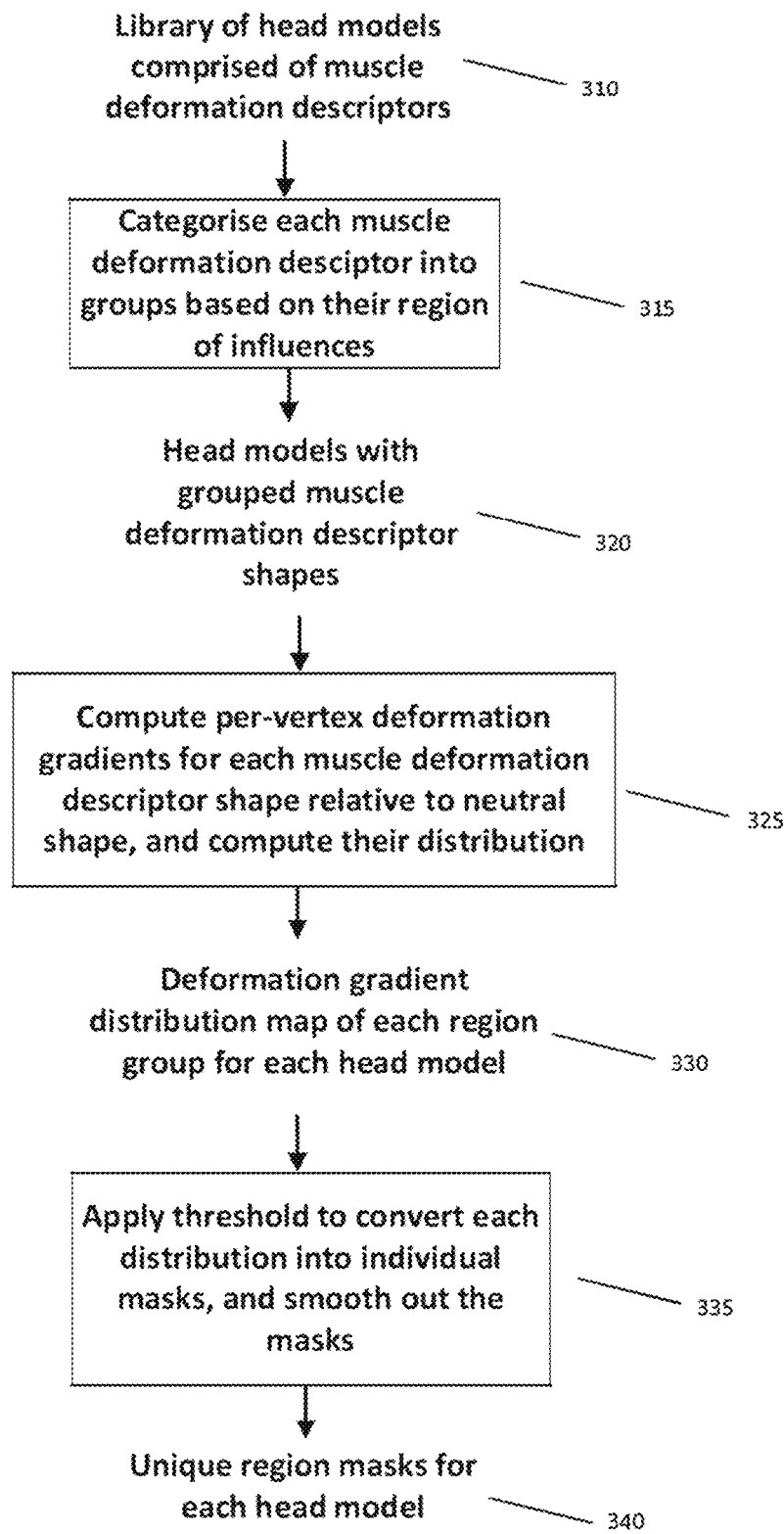
FIG. 3 is a flow diagram of the region mask generating process.

Referring to FIG. 3 the process of region segmentation and recomposition is shown. The process starts with a library 310 of various head models with muscle deformation descriptor decomposition. Each muscle deformation descriptor is categorised into groups based on the regions of influence. The head models are then grouped 320 based on the muscle deformation descriptor shapes. The system then computes per-vertex deformation gradients for each muscle deformation descriptor shape relative to the neutral shape. The distribution of the deformation gradients is computed 325 and a deformation gradient distribution map for each regional group for each head model (character) is calculated. A threshold is used to convert the distribution into masks 335 which are smoothed out. This results in a unique region mask for each model 340.

Blending of the Geometry Model

A mean head model ($\overline{M}$) is computed by averaging all head models (M). A head delta is defined and is the difference between a head model and the mean head model $$(\Delta M_i = M_i - \overline{M})$$

A new head can be reconstructed using the blend-shape equation:

$$M = \overline{M} + \sum_{i=1}^{N} (w_i \times \Delta M_i), \text{ where } \sum_{i=1}^{N} w_i^2 \leq s$$

is enforced to guarantee that the combination of deltas is a feasible solution.

In a preferred embodiments is a user defined value that can be used to change the caricature of the output head model.

The blending process described above is a global blending step of the head model, and will result in a neutral shape and all expression shapes in the expression blend-shape grid.

Regional Blending

Each region may be blended independently of the global blending, and combined together, and applied to the globally blended head model to form the final blended model. Blending and recomposition of the regions is achieved as follows.

The head model as well as the static region masks are blended together based on the user provided blending weights. The same convex constraints discussed above are applied to regional blending as are applied to global blending.

Referring again to FIG. 1 to blend based on a region the system segments 135 each region by using the blended static regional masks 140 previously discussed to generate segmented regional models 145 of each muscle deformation descriptor.

The system then performs a procrustes transformation 150 to align each segmented-out vertices to their respective location on the mean head model. In this step, each vertex point is weighted differently based on the regional mask. The procrustes transformation is computed using the neutral shape and applied to the neutral and expression shapes, so that expression shapes have the same alignment as the neutral shape.

The neutral shape of each of the regions 155 are combined together using the finite element method (FEM). The goal of the FEM is to minimise the following objective function:

$$E = \alpha_1 E_{region} + \alpha_2 E_{smooth} + \alpha_3 E_{centroid}$$

where $E_{region}$, $E_{smooth}$ and $E_{centroid}$ are the region blending term, smoothing term and the centroid constraint term:

$$E_{region} = \sum_{r=1}^{R} \int w_r \|y_r - x\|^2 dx$$

where $w_r$ is the blended mask weight for region r, R is the total number of regions to blend, $y_r$ is the target vertex coordinates for the aligned region segmentation and x is the globally blended vertex coordinates. $E_{smooth}$ is a second order Sobolev smoothing function, which ensure transition from region to region are smooth and realistic.

$$E_{smooth} = \int a_1 \left\|\frac{\partial y}{\partial x}\right\|^2 + a_2 \left\|\frac{\partial^2 y}{\partial x^2}\right\|^2 dx$$

Where $\sigma_1$ and $\sigma_2$ are smoothing parameters that controls the smoothness of the contour and surface curvatures respectively and, y is the resulting vertex coordinates. $E_{controid}$ introduces a weak constraint that ensure the resulting blended regions to stay at their respective locations in the global blended mesh.

$$E_{centroid} = \int \|c(x) - c(y)\|^2 dx$$

where c is a centroid function that returns the centroid of each element in the mesh. Minimising the objective function E can be linearized in a finite element setting. Solving this problem involves solving systems of sparse linear of equations.

To combine the regional meshes of expression shapes, the process described above is applied. However, the region blending term is changed to operate on the deformation gradient tensors rather than on the vertex positions.

$$E_{region\_def} = \sum_{r=1}^{R} \int w_r \|F_r - F_g\|^2 dX$$

where $$F_g = \frac{\partial y_g}{\partial x_g}$$

is the deformation gradient tensor computed from each vertex position of the globally blended expression shape ($y_g$) and the corresponding vertex position of the globally blended neutral shape ($x_g$). And $$F_r = \frac{\partial y_r}{\partial x_r}$$

is the deformation gradient tensor computed from each vertex position of the regionally blended expression shape ($y_r$) and the corresponding vertex position of the regionally blended neutral shape ($x_r$). The objective function for FEM fitting becomes:

$$E = \alpha_1 E_{region\_def} + \alpha_2 E_{smooth} + \alpha_3 E_{centroid}$$

The anatomical assets accessories for the resultant model are generated either via RBF interpolation or through rivet rigging. RBF interpolation is applied on assets that are not attached to the face mesh, such as skull, teeth, eyeballs etc. Whereas rivet rigging is applied on assets that have attachment points on the face mesh, such as eyelashes and facial hairs.

Once the regional head models are computed the models may be compressed 170 and added to the blending model. The above steps would typically be pre-computed 195 in preparation. Online 198 the blending weights may be applied to a blending model to create the blended head model in real time. An example may be creating a blended digital human based on the user the digital human is interacting with.

Bone Structure Preservation

Figure 5A:
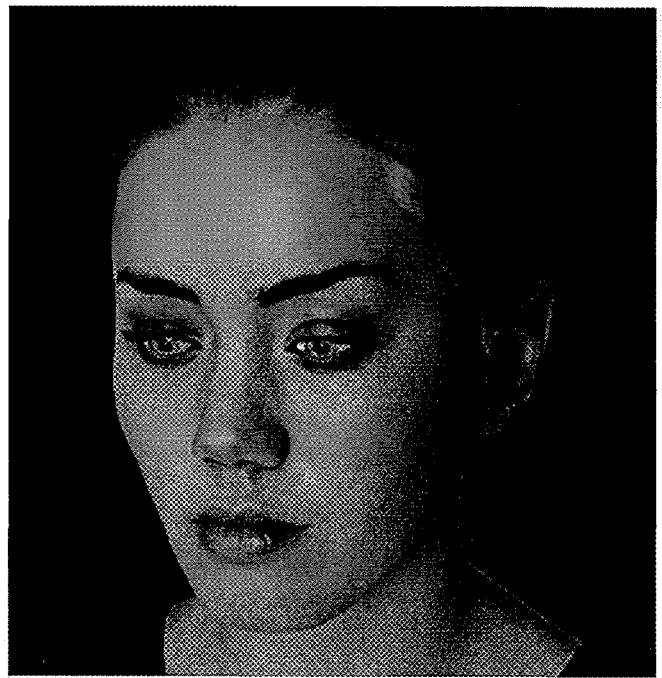
FIG. 5A is an example of global geometry blending.
Figure 5A:
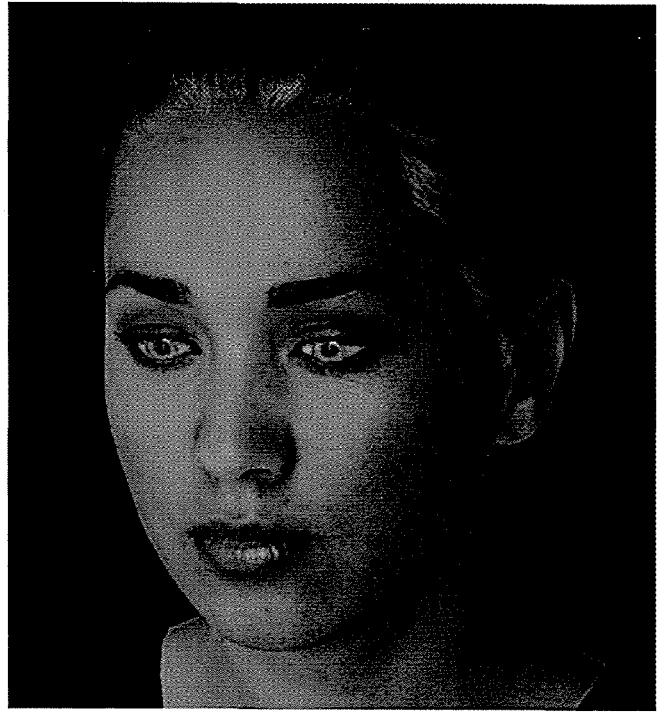
Figure 5B:
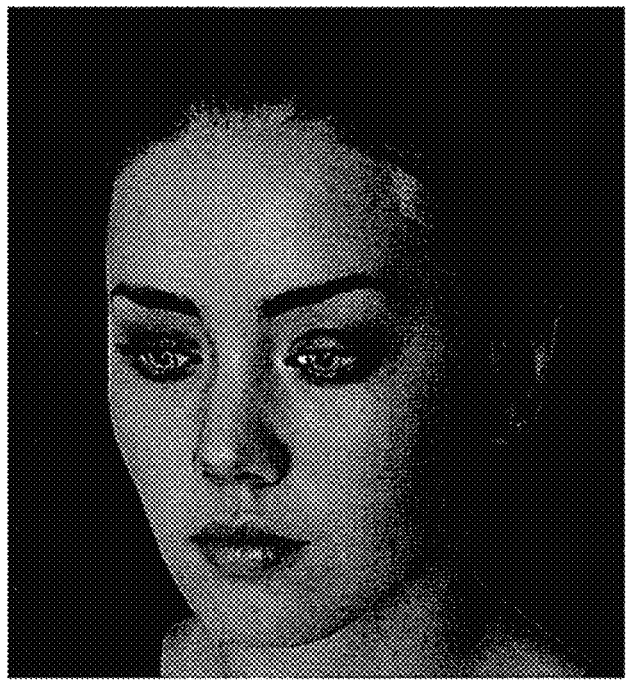
FIG. 5B is an example of regional geometry blending with the bone structure preserved.
Figure 5B:
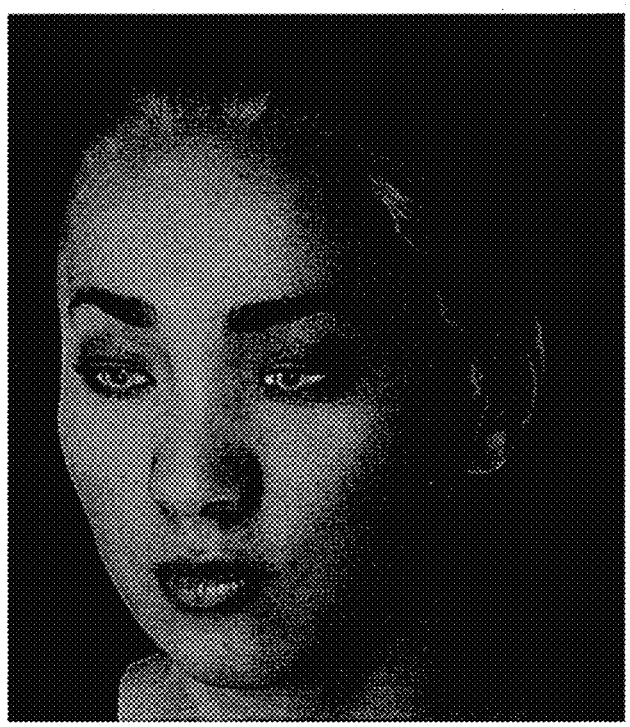
Figure 5C:
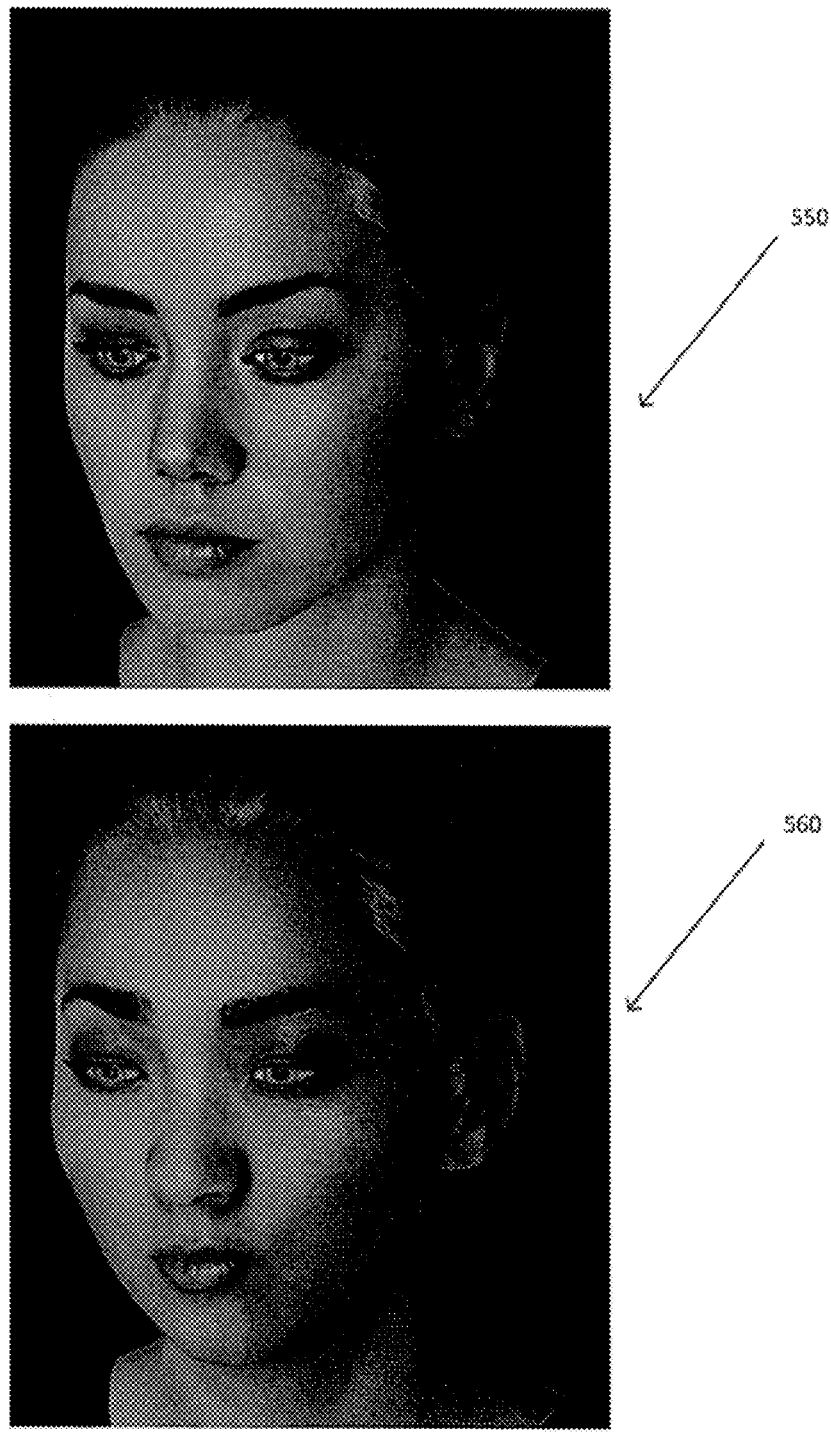
FIG. 5C is an example of regional geometry blending without the bone structure preserved.
Figure 6A:
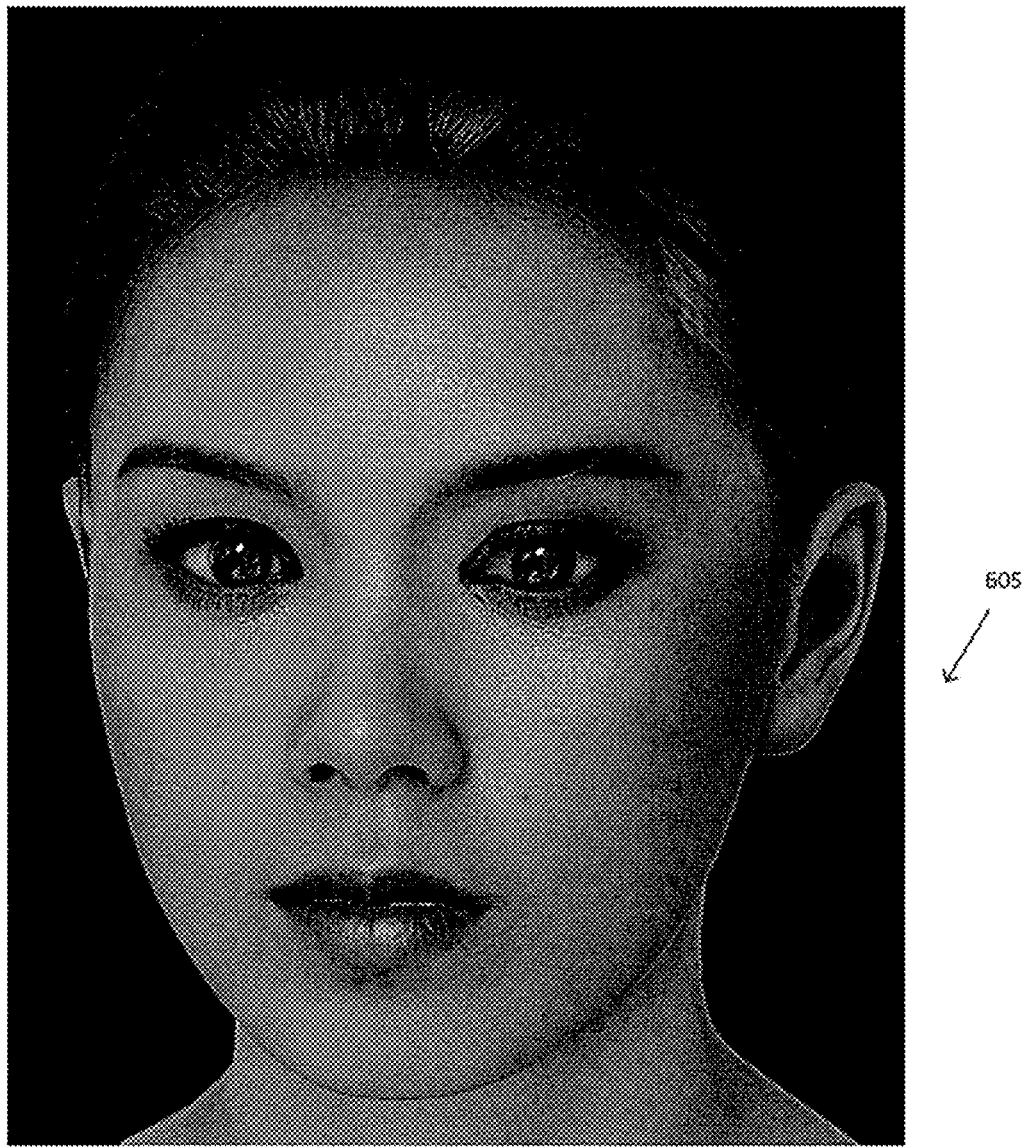
FIG. 6A is an example of a head with a first texture.
Figure 6B:
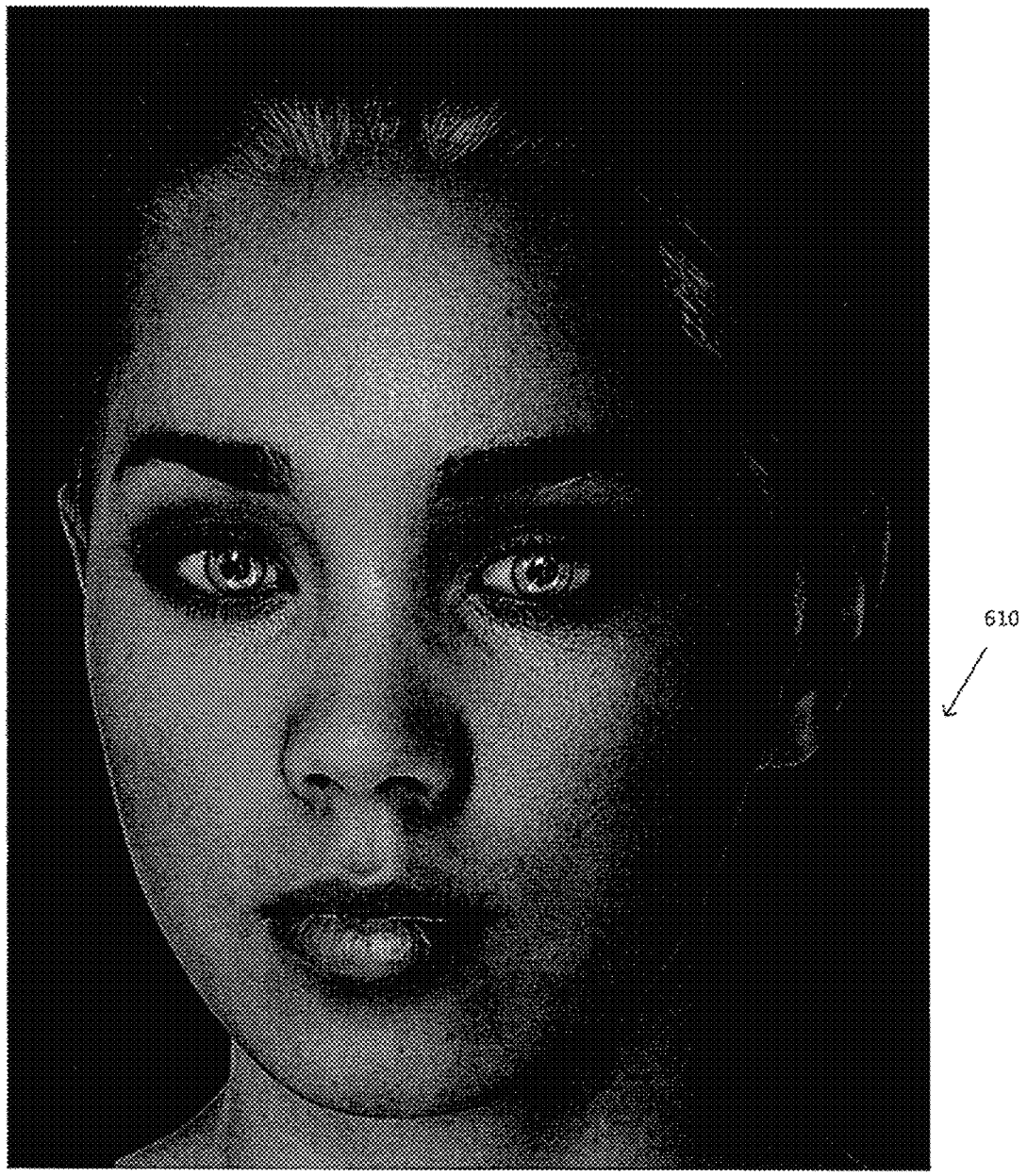
FIG. 6B is an example of a head with a second texture.
Figure 6C:
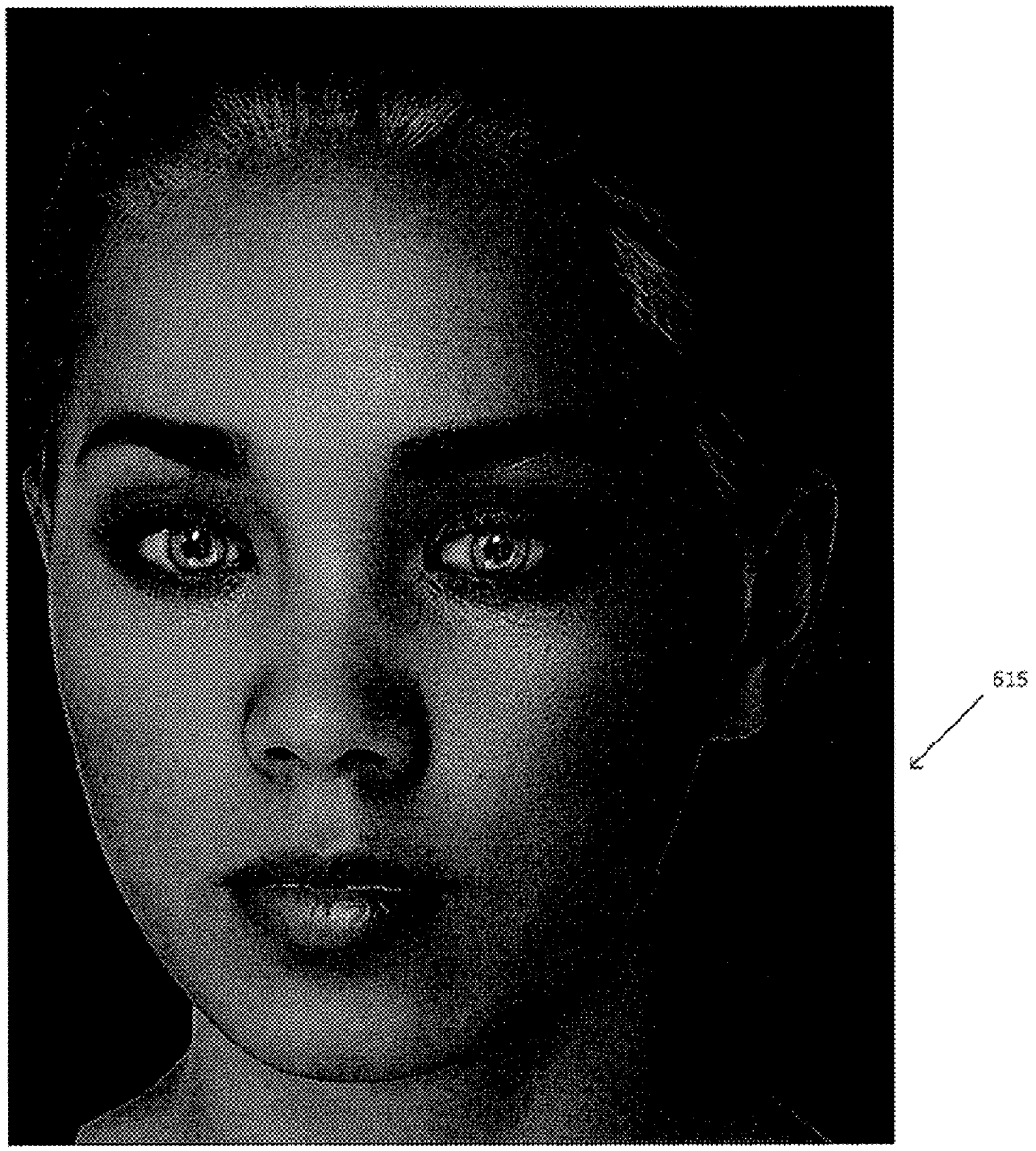
FIG. 6C is an example of a head with the first and second textures blended.

Since the system aligns the region segmentations to the globally blended face model, the system maintains the size of facial features and relative positions between different facial features. This is equivalent of maintaining the bone structure of the face (to the globally blended head model) when altering the identity. Moreover, the bone structure of a head model can be changed by altering the alignment ratio. Base on this relationship, the system can change the alignment ratio to alter the bone structure. Referring to FIGS. 5A-5C examples of blending features are illustrated. In all cases the starting model shown 510, 530, 550 is the same. In FIG. 5A global blending has been applied to the model 520. In FIG. 5B regional blending to a new identity has been applied in which bone structure is preserved. In FIG. 5C regional blending to a new identity has been applied in which bone structure has not been preserved.

Demographics Prediction

The system is also able to learn, predict and apply demographic predictions 167 to a head model from a set of demographic parameters, including age, gender, ethnicity, and physique, using Partial Least Squares Regression (PLSR) with a quadratic predictor transformation.

$$\phi(X) = TP^T + E$$

$$Y = TQ^T + F$$

where X is the demographic parameters and Y is the estimated coordinates of mesh vertices. $\phi(X)$ is a quadratic transformation function of X. $T = \phi V$ is a matrix of extracted score vectors from $\phi$, obtained through a weight matrix V that maximises the explained covariance between $\phi$ and Y. The matrix P and Q are the loading matrices. E and F are residual matrices that encapsulate the unexplained variance of X and Y, respectively.

PLSR estimate the optimal relationship between the demographic parameters (X) and the coordinates of vertices in the head models (Y), while preserving the level of variance explained in the demographic parameters (X). This is because T is extracted such that it is highly relevant to Y by modelling the relationship between $\phi$ and Y. In this application, PLSR allows the use of a simple relationship (defined in the latent space) to model the complex multivariate problems of estimating geometrical changes induced by co-varying the demographic parameters. For example, the effect of ageing may change for different genders, ethnicities, or physiques.

To ensure real-time performance, expensive computations, including regional blending, deformation transfer, and smoothing, may be pre-computed 195. A blendshape interpolation system is then used to re-interpolate the deformations in real-time.

Alternatively, a PLSR model can also be trained to emulate the blending system. PLSR can provide optimal compression to the blending models and reduce real-time blending cost and memory footprint.

Customisation

Figure 8A:
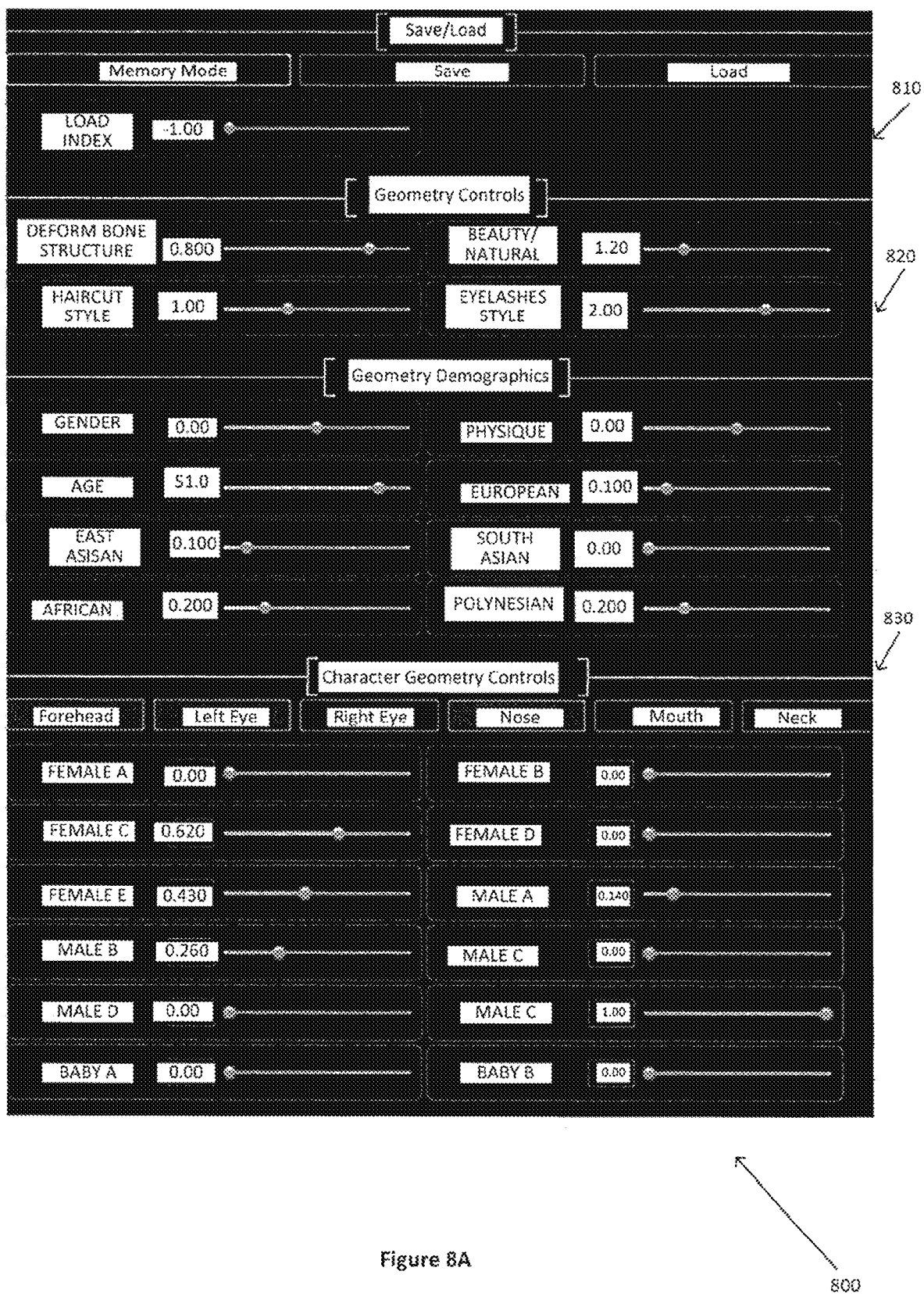
FIG. 8A is an example of a geometry control interface.

A user interface illustrated in FIG. 8A to the blending system may allow the user to have the ability to customise geometry related features 810, 820, 830 of a digital human through manipulation of geometry assets. This may be in real time. Assets that may be manipulated include switching eyelashes, Irises, teeth, tongue, hair, accessories and clothing.

When blending body parts; customisation of body types, muscle mass, and regional characteristics, for example, broad shoulders and big feet may be blended. Blending on body parts or body follows the outline above including regional blending again based on a muscle model.

Texture Blending

Skin textures from each training avatars are passed through a hierarchy of bilateral Gaussian filters, where each layer of the hierarchy is designed to extract a particular type of texture details, such as facial hairs, wrinkles, moles, freckles and skin pores. Once the layers are extracts, each layer can then be independently blended and composited back to form a new texture map. The advantage of this layering approach is that the skin details can be preserved during the blending process.

When blending texture, the system may have a database of facial textures for n (n>=2) digital characters. Each set of facial textures is defined as a collection of texture maps ($T_1$, $T_2$, . . . , $T_m$), reconstructed from photographs of an actor/actress. The sets of texture maps for all digital characters in the set should have consistent lighting conditions and colour space.

Texture maps represent spatially varying features which can be used in a lighting model to render the final image. A plurality of texture maps may represent spatially varying graphical qualities of the subject which are used by a shading model to render. Examples of texture maps include albedo maps, diffuse maps, shading maps, bump maps or specular maps. In another embodiment, the rendering texture map can be generated from a deep learning model such as a deep appearance model (S Lombardi—2018).

Preferably individual pixels on the set of texture maps denote the same facial anatomical positions for each digital character. While point-to-point correspondence is not strictly required among different digital characters, the facial features should occupy similar positions on the sets of texture maps. The size of the texture maps should be the same for all digital characters.

Figure 2:
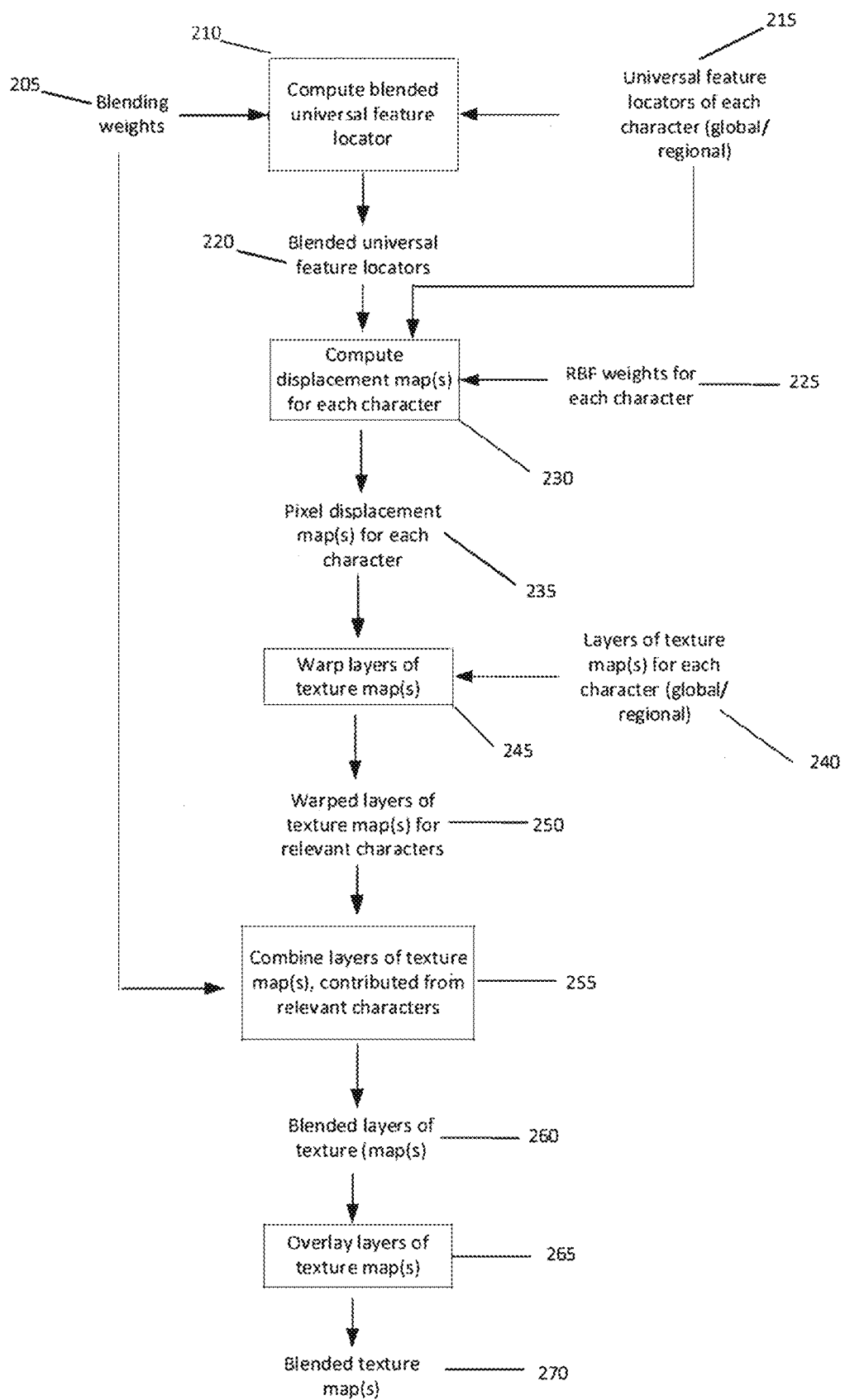
FIG. 2 is a flow diagram of the texture blending process.

Referring to FIG. 2, universal feature locators ($p_1$, $p_2$, ..., $p_n$) 215 that outline the facial features are identified. These universal feature locators (as pixels locations on the albedo maps) can be identified manually, semi-automatically, or automatically for each digital character. To identify universal feature locators automatically using machine learning algorithms, multiple examples of the universal feature locators identified on albedo maps are required. These examples are fed into a suitable machine learning algorithm to learn the relationship between image features of the albedo maps and the positions of the universal feature locators. Once such a relationship has been established, the position of the universal feature locators may be detected automatically on an albedo map of a new digital character. The texture maps ($T_1$, $T_2$, ..., $T_m$) for each digital character are separated into l layers, compromising a base layer, and l-1 feature layers. The base layers ($T_{11}$, $T_{21}$, ..., $T_{m1}$) contains the most general and universal features of the digital character, for example, the skin complexion and the overall shapes of facial features. Each feature layer contains facial features of different sizes and contrast ($T_{i1}$, $T_{i2}$, ..., $T_{il}$, j=2, 3, ... l, where $$\sum_{j=1}^{l} (T_{ij}) = T_{ij}, i = 1, 2, ..., m$$

Individual feature layers ($T_{ij}$, j=2, 3, ..., l) are computed as the difference/delta between the original texture maps and bilateral Gaussian filtered texture maps, with the features that have been taken into account by other feature layers removed. The sum of a base layer and all feature layers of texture maps for a digital character should reconstruct the original texture maps.

The parameters required by the bilateral Gaussian filter includes the domain and range standard deviations. The standard deviation of the domain filter is determined by the width of the feature in pixels. Smaller features require a smaller domain standard deviation to extract, and larger features a larger domain standard deviation to extract. The range of standard deviations is determined by the contrast of the features. A larger range of standard deviations will result in smoothing of neighbouring pixels with a larger contrast.

A weight matrix 225 for the radial-basis function interpolation (RBF), calculated based on the pixel positions of the universal feature locators 215, is computed for each digital character.

To generate texture maps an end user provides to the system a series of blending weights 205 ($w_{ij}$, where i=1 2, ... n and j=1, 2, ..., l). The number of blending weights is the product of the number of digital characters and the number of layers that the texture maps are separated into. The weights are bounded to be between 0 and 1. The sum of the blending weights of all digital characters for the base layer ($T_{11}$, $T_{21}$, ... $T_{m1}$) of the texture maps should be 1. This constraint is not required for the feature layers.

The pixel positions of universal feature locators (q, 220) in the output texture maps are computed 210 as the linear combination of the weighted universal feature locator positions of the digital characters.

$$q = \sum_{i}^{n} w_{i1} p_i$$

The universal feature locators (q) are then used as blended universal feature locators (q) 220. A displacement map 235 is created between q and pi (i=1, 2, ..., n) for each digital character 230 using a radial basis function interpolation, and the set of texture maps, separated into layers, are warped ($T'_{jk}$, j=1, 2, ..., l; m=1, 2, ..., m) 250 based on the displacement maps to reflect the positions of the output universal feature locator q. This may be done using RBF for each character.

The output texture maps ($S_1$, $S_2$, ..., $S_m$) 270 are generated by linearly combining the weighted texture maps.

$$S_k = \sum_{i=1,j=1}^{n,l} w_{ij} T'_{ij}, \text{ where } k = 1, 2, ..., m$$

Blending masks are created for each region of the texture maps. The weights in the blending masks are between 0 and 1. The sum of all regional blending mask weights for any pixel is 1. For each region, the relevant pixels in the texture maps are identified based on the blending masks.

The generation of the regional texture maps are performed, using the same process as described in the above section. The individual regional texture maps are combined together 255 to form the full texture maps, using the blending masks.

As part of the geometry normalization, textures may be transferred to new normalized topology through automated process requiring a UV based transfer method.

Textures may undergo a normalization based on lighting intensities and colour space, including ambience levels to allow blending of textures to remain consistent. This may be done using computer vision system that predicts the best exposure for a target texture before adding into the library.

In one embodiment, output texture maps are generated through a machine learning or a deep learning framework such as the Generative Adversarial Networks or Variation Autoencoders. This may be generated using the following steps:

1. For each of the digital characters, extracting a predefined set of texture maps. Feature layers from texture maps may be extracted using any suitable method, including bilateral Gaussian filters, or other manual, or automated image-feature filtering techniques.

2. For each feature layer, training a machine learning or a deep learning model using corresponding feature layers from each digital character. This would result in a machine learning model for each feature layer: for example, one machine learning or deep learning model for the base tone, another model for skin freckles etc. Examples of machine learning models which may be used are Generative Adversarial Networks, Variation Autoencoders or variations of the Deep Convolutional Neural Network.

3. During real-time texture reconstruction, individually synthesizing each feature layer through model inference, combining the individual reconstructed feature layers to form output texture maps ready for rendering.

In further embodiments a makeup layer system that can apply or remove makeup onto the face to enhance and/or body may be added to customise the look of the digital human. Texture related features such as eye color, whiteness of teeth, skin pigment, freckles, tattoos, and scars may also be manipulated to enhance the realism or desired custom look of digital human.

PLSR may be used to predict demographical changes in texture maps, using a similar workflow as described in the geometry blending process.

Adding and Removing Skin Imperfections

The layer separation workflow described in the section of texture blending can be used to remove details and imperfections of the skin. For example, by adjusting the filter parameters (domain and range standard deviations), bilateral Gaussian filter can be used to extract features, for example, skin pores, wrinkles, freckles, acnes, or facial hairs, while preserving other details. The contributions of the layers that encapsulate these features to the output set of texture maps can be reduced, exaggerated or removed completely, for a digital character.

Similarly, the layers that encapsulate these features can be transferred to other digital characters to change the visual appearance.

Digital Makeup

Another application of the layer separation workflow is to apply or to remove digital makeup. The effect of makeup procedures, for example, the application of skin foundation, lip colour, blusher, facial contouring, eye liner, eye shadow, and highlighter can be extracted from a digital character. Such effect may be reduced, enhanced, or removed from the digital character. The effect of digital makeup may also be applied to other digital characters.

Application of digital makeup requires a high level of accuracy in the identification of pixel correspondences between the texture maps with and without makeup. Image registration algorithms, for example, optical flow or template matching, can be used to improve the accuracy of the point-to-point correspondence among texture maps of digital characters.

Individual-specific feature locators can also be included in addition to the universal feature locators to improve the accuracy of the point-to-point correspondence between the texture maps with and without makeup. For example, an individual-specific feature locator can be created to mark a skin mole that is present in both the texture maps with and without makeup. Tattoos, birthmarks, or other large skin features can also be applied, removed, or reduced in intensity in a similar way as the digital makeup.

Figure 9A:
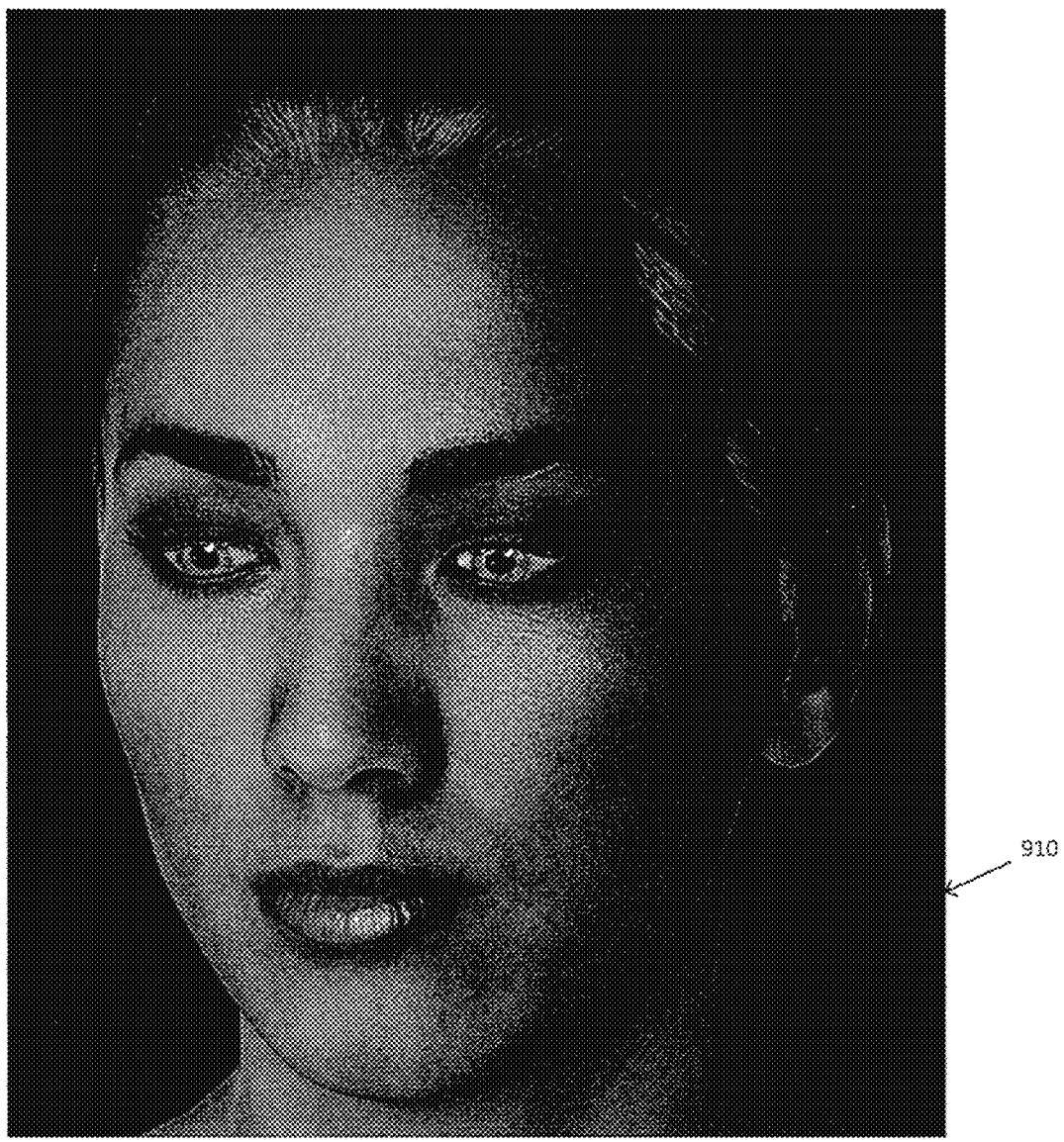
FIG. 9A is an example of a head showing the original texture.
Figure 9B:
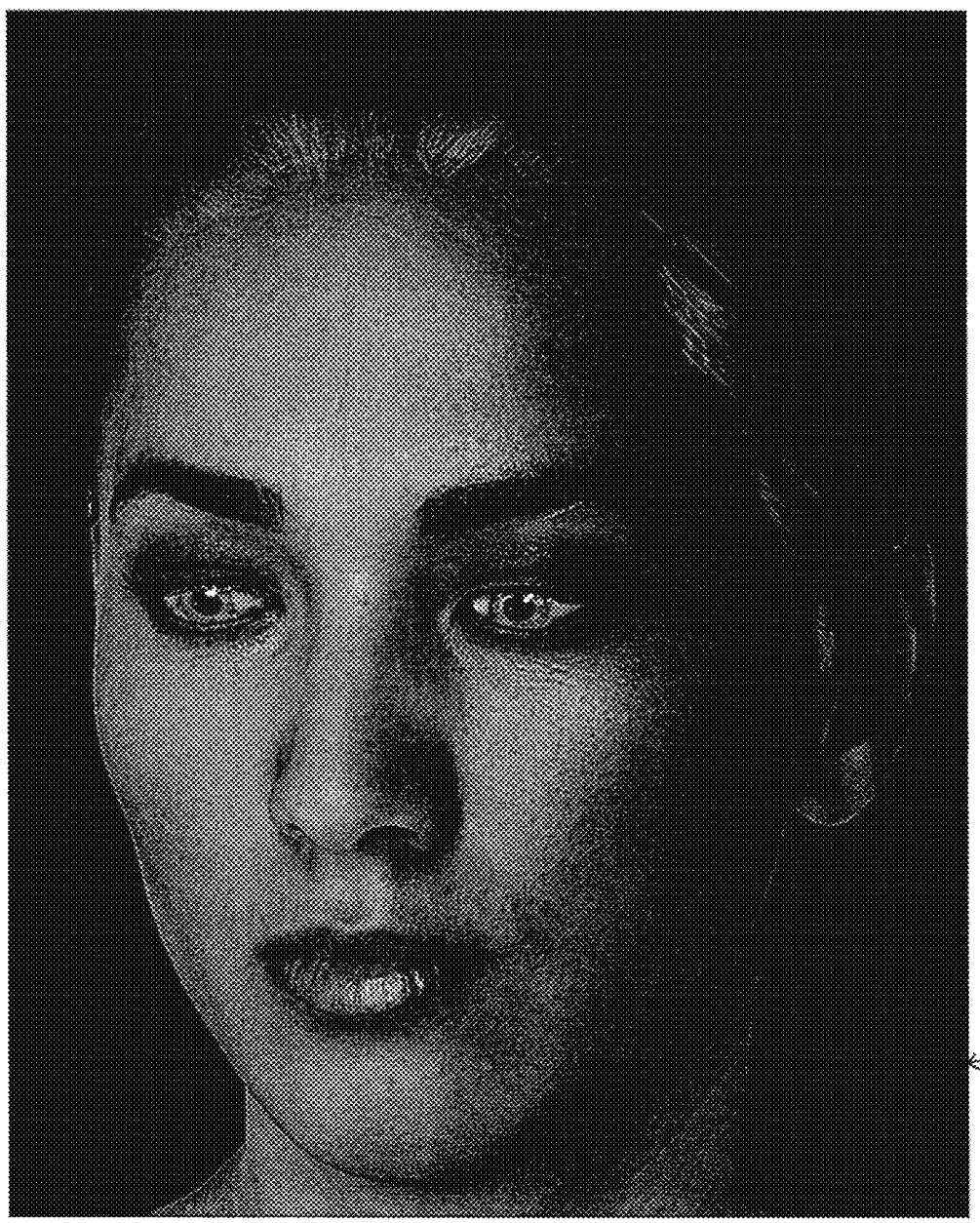
FIG. 9B is an example of a head showing the addition of a texture with skin imperfections.
Figure 9C:
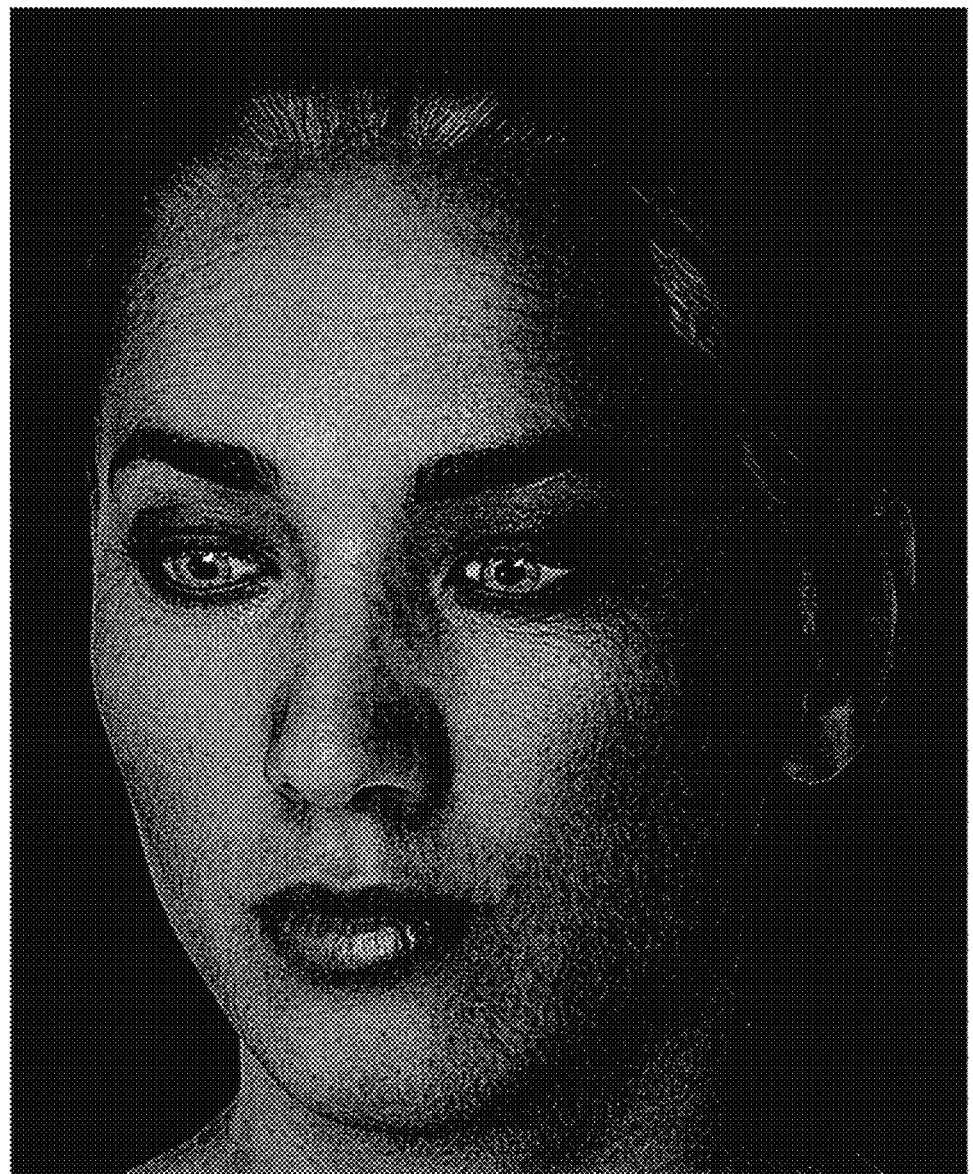
FIG. 9C is an example of a head showing the addition of a texture with wrinkles and facial hair.

An example of the texture system applied to a model is illustrated in FIGS. 9A to 10C. FIG. 9A shows a head model 910 with the original texture, FIG. 9B shows a head model 920 with the addition of a texture with skin imperfections, and FIG. 9C shows an example of a head model 930 with the addition of a texture with wrinkles and facial hair.

Figure 10A:
FIG. 10A is an example of an eye showing a reference texture.
Figure 10B:
FIG. 10B is an example of an eye with a new base layer texture.
Figure 10C:
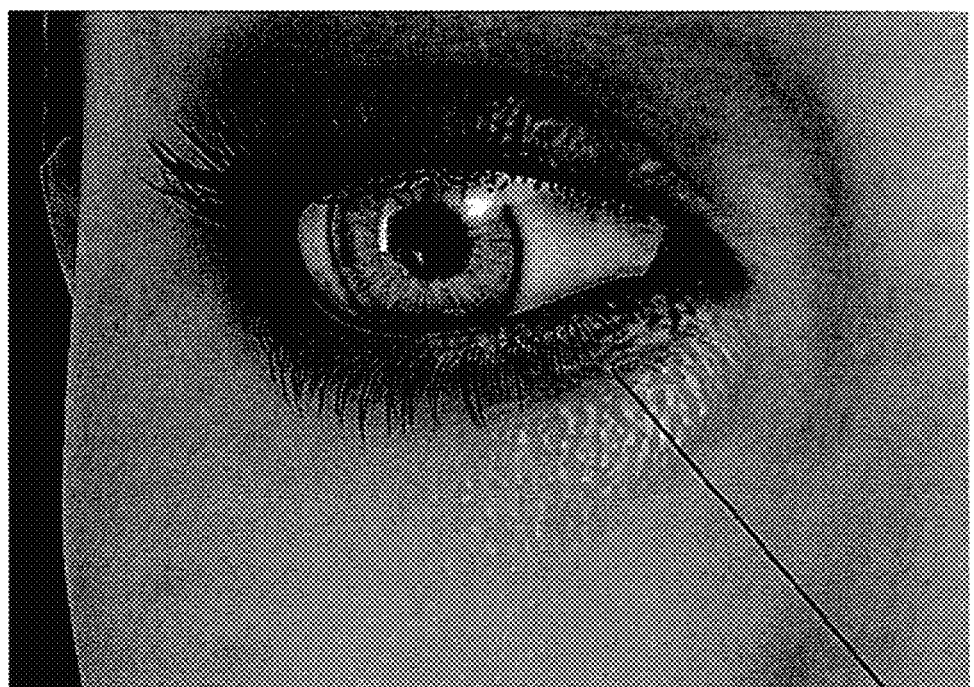
FIG. 10C is an example of an eye with a new detail layer texture.

The texture system can also be applied to other assets for examples an eye shown in FIGS. 10A-10C. FIG. 10A shows an eye showing with the reference texture 1010, FIG. 10B shows the same eye with a new base layer texture 1020 and FIG. 10C shows the eye of FIG. 10A with a new detail layer texture 1030.

Figure 8B:
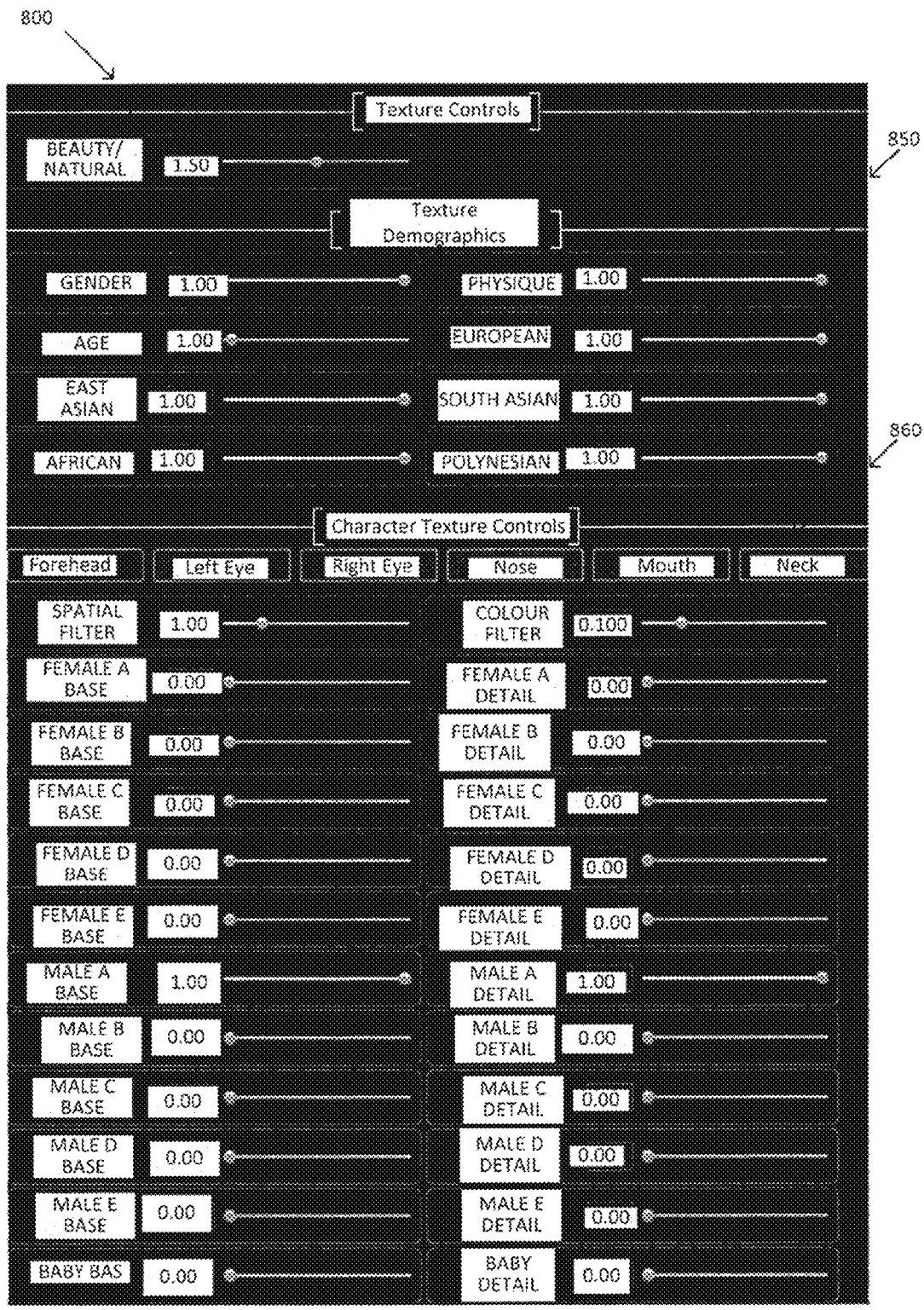
FIG. 8B is an example of a texture control interface.
Figure 8C:
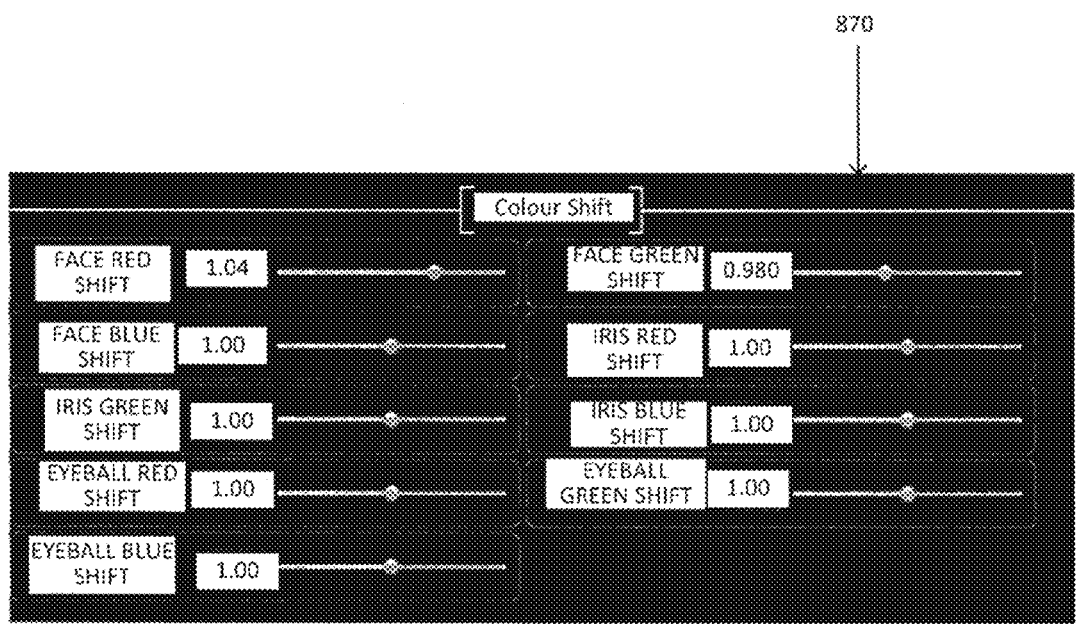
FIG. 8C is an example of a colour control interface.

A user interface 800 to the system illustrated in FIGS. 8B-8C may allow the user to have the ability to customise texture related features 850, 860 and colour 870 of a digital human through manipulation of character textures and colours.

Interpretation

The methods and systems described may be utilized on any suitable electronic computing system. According to the embodiments described below, an electronic computing system utilizes the methodology of the invention using various modules and engines.

The electronic computing system may include at least one processor, one or more memory devices or an interface for connection to one or more memory devices, input and output interfaces for connection to external devices in order to enable the system to receive and operate upon instructions from one or more users or external systems, a data bus for internal and external communications between the various components, and a suitable power supply. Further, the electronic computing system may include one or more communication devices (wired or wireless) for communicating with external and internal devices, and one or more input/output devices, such as a display, pointing device, keyboard or printing device.

The processor is arranged to perform the steps of a program stored as program instructions within the memory device. The program instructions enable the various methods of performing the invention as described herein to be performed. The program instructions may be developed or implemented using any suitable software programming language and toolkit, such as, for example, a C-based language and compiler. Further, the program instructions may be stored in any suitable manner such that they can be transferred to the memory device or read by the processor, such as, for example, being stored on a computer readable medium. The computer readable medium may be any suitable medium for tangibly storing the program instructions, such as, for example, solid state memory, magnetic tape, a compact disc (CD-ROM or CD-R/W), memory card, flash memory, optical disc, magnetic disc or any other suitable computer readable medium.

The electronic computing system is arranged to be in communication with data storage systems or devices (for example, external data storage systems or devices) in order to retrieve the relevant data.

It will be understood that the system herein described includes one or more elements that are arranged to perform the various functions and methods as described herein. The embodiments herein described are aimed at providing the reader with examples of how various modules and/or engines that make up the elements of the system may be interconnected to enable the functions to be implemented. Further, the embodiments of the description explain, in system related detail, how the steps of the herein described method may be performed. The conceptual diagrams are provided to indicate to the reader how the various data elements are processed at different stages by the various different modules and/or engines.

It will be understood that the arrangement and construction of the modules or engines may be adapted accordingly depending on system and user requirements so that various functions may be performed by different modules or engines to those described herein, and that certain modules or engines may be combined into single modules or engines.

It will be understood that the modules and/or engines described may be implemented and provided with instructions using any suitable form of technology. For example, the modules or engines may be implemented or created using any suitable software code written in any suitable language, where the code is then compiled to produce an executable program that may be run on any suitable computing system. Alternatively, or in conjunction with the executable program, the modules or engines may be implemented using, any suitable mixture of hardware, firmware and software. For example, portions of the modules may be implemented using an application specific integrated circuit (ASIC), a system-on-a-chip (SoC), field programmable gate arrays (FPGA) or any other suitable adaptable or programmable processing device.

The methods described herein may be implemented using a general-purpose computing system specifically programmed to perform the described steps. Alternatively, the methods described herein may be implemented using a specific electronic computer system such as an artificial intelligence computer system etc., where the computer has been specifically adapted to perform the described steps on specific data captured from an environment associated with a particular field.

Real-time performance & timing control; real-time response of agents to user inputs. The latency of each part of the system needs to be kept at a minimum while on-time execution of actions need to be guaranteed. Therefore, a strict temporal model is a necessity A number of methods have been described above. It will be appreciated that any of these methods may be embodied by a series of instructions, which may form a computer program. These instructions, or this computer program, may be stored on a computer readable medium, which may be non-transitory. When executed, these instructions or this program may cause a processor to perform the described methods. In some cases, there may be provided a device or system which is provided which modules, each module configured to perform one or more of the steps noted above.

While the methods noted above have been described in a particular order, this should be taken as illustrative only. That is, unless the context requires otherwise (such as a dependency), steps may be performed in any order or in parallel in different embodiments.

In addition, in some cases steps may be omitted from the overall method, unless the context requires otherwise.

The terms "comprise", "comprises" and "comprising", as used in this description and unless otherwise noted, are intended to have an inclusive meaning. That is, they will be taken to mean an inclusion of the listed components or elements which the use directly references, and possibly also of other non-specified components or elements.

Reference to any document in this specification does not constitute an admission that it is prior art, validly combinable with other documents or that it forms part of the common general knowledge.

While the present invention has been illustrated by the description of the embodiments thereof, and while the embodiments have been described in detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the applicant's general inventive concept.

The invention claimed is:

1. A method for creating a model of a virtual object or digital entity,
   the method comprising:
      receiving a plurality of human body portion models, wherein each respective human body portion model has a plurality of basic shapes, each basic shape comprising one or more regions and a set of muscle deformation descriptors influencing animation of a sequence of events within the respective basic shape according to corresponding muscle action units, wherein the plurality of basic shapes is a part of a face;
      categorizing the muscle deformation descriptors according to groups based on a region influenced ("region of influence") by the muscle action units of categorized muscle deformation descriptors;
      generating at least one region masks for each basic shape based on the region of influence;
      receiving a plurality of specified demographic prediction modifications to be made to one or more of the basic shapes of at least one human body portion model; and
   generating at least one modified basic shape by blending at least two of the specified demographic prediction modifications together at a respective region mask, further comprising: generating at least one modified basic shape that corresponds to one of: an eyeball asset, a cornea asset, a teeth asset, a tongue asset and a skull asset.

2. The method of claim 1, wherein generated the region mask comprises:
   generating the region mask based on at least one deformation gradients relative to a shape of undeformed muscles corresponding to the muscle action units of categorized muscle deformation descriptors.

3. The method of claim 1, wherein the demographic prediction modifications include preserve variables to preserve selected features.

4. The method of claim 1, wherein the plurality of basic shapes belong to one of: a body shape, a partial body shape, an upper body shape, a face shape and part of a partial face shape.

5. The method of claim 4, wherein the plurality of the specified demographic prediction modifications includes at least one of: an ageing prediction modification, a gender prediction modification, an ethnicity prediction modification and a physique prediction modification.

6. A system comprising one or more processors, and a non-transitory computer-readable medium including one or more sequences of instructions that, when executed by the one or more processors, cause the system to perform operations comprising:
   receiving a plurality of human body portion models, wherein each respective human body portion model has a plurality of basic shapes, each basic shape comprising one or more regions and a set of muscle deformation descriptors influencing animation of a sequence of events within the respective basic shape according to corresponding muscle action units, wherein the plurality of basic shapes is a part of a face;
   categorizing the muscle deformation descriptors according to groups based on a region influenced ("region of influence") by the muscle action units of categorized muscle deformation descriptors;

generating at least one region masks for each basic shape based on the region of influence;

receiving a plurality of specified demographic prediction modifications to be made to one or more of the basic shapes of at least one human body portion model; and generating at least one modified basic shape by blending at least two of the specified demographic prediction modifications together at a respective region mask, further comprising: generating at least one modified basic shape that corresponds to one of: an eyeball asset, a cornea asset, a teeth asset, a tongue asset and a skull asset.

7. The system of claim 6, wherein generate the region mask comprises:

generate the region mask based on at least one deformation gradients relative to a shape of undeformed muscles corresponding to the muscle action units of categorized muscle deformation descriptors.

8. The system of claim 6 wherein the demographic prediction modifications include preserve variables to preserve selected features.

9. The system of claim 6, wherein the plurality of basic shapes belong to one of: a body shape, a partial body shape, an upper body shape, a face shape and part of a partial face shape.

10. The system of claim 6, wherein the plurality of the specified demographic prediction modifications includes at least one of: an ageing prediction modification, a gender prediction modification, an ethnicity prediction modification and a physique prediction modification.

11. A computer program product comprising a non-transitory computer-readable medium having a computer-readable program code embodied therein to be executed by one or more processors, the program code including instructions for:

receiving a plurality of human body portion models, wherein each respective human body portion model has a plurality of basic shapes, each basic shape comprising one or more regions and a set of muscle deformation descriptors influencing animation of a sequence of events within the respective basic shape according to corresponding muscle action units, wherein the plurality of basic shapes is a part of a face;

categorizing the muscle deformation descriptors according to groups based on a region influenced ("region of influence") by the muscle action units of categorized muscle deformation descriptors;

generating at least one region masks for each basic shape based on the region of influence;

receiving a plurality of specified demographic prediction modifications to be made to one or more of the basic shapes of at least one human body portion model; and generating at least one modified basic shape by blending at least two of the specified demographic prediction modifications together at a respective region mask, further comprising: generating at least one modified basic shape that corresponds to one of: an eyeball asset, a cornea asset, a teeth asset, a tongue asset and a skull asset.

12. The computer program product of claim 11, wherein generated the region mask comprises:

generating the region mask based on at least one deformation gradients relative to a shape of undeformed muscles corresponding to the muscle action units of categorized muscle deformation descriptors.

13. The computer program product of claim 11, wherein the demographic prediction modifications include preserve variables to preserve selected features.

14. The computer program product of claim 11, wherein the plurality of basic shapes belong to one of: a body shape, a partial body shape, an upper body shape, a face shape and part of a partial face shape.

15. The computer program product of claim 11, wherein the plurality of the specified demographic prediction modifications includes at least one of: an ageing prediction modification, a gender prediction modification, an ethnicity prediction modification and a physique prediction modification.

* * * * *